(12) United States Patent
Costin et al.

(10) Patent No.: US 8,916,659 B1
(45) Date of Patent: Dec. 23, 2014

(54) PROCESS AND APPARATUS FOR CONTINUOUS SOLUTION POLYMERIZATION

(71) Applicant: ExxonMobil Chemical Patents Inc., Baytown, TX (US)

(72) Inventors: Quintin P. Costin, Baton Rouge, LA (US); Periagaram S. Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 14/068,867

(22) Filed: Oct. 31, 2013

(51) Int. Cl.
| | | |
|---|---|---|
| *C08F 2/04* | (2006.01) | |
| *C08F 210/06* | (2006.01) | |
| *B01J 19/00* | (2006.01) | |
| *B01J 19/18* | (2006.01) | |

(52) U.S. Cl.
CPC ............ *C08F 210/06* (2013.01); *B01J 19/002* (2013.01); *B01J 19/0066* (2013.01); *Y10S 526/92* (2013.01)

USPC ................ 526/68; 526/88; 526/920; 422/131

(58) Field of Classification Search
USPC ............................... 526/68, 920, 88; 422/131
See application file for complete search history.

(56) References Cited

U.S. PATENT DOCUMENTS

| | | | |
|---|---|---|---|
| 3,912,698 | A | 10/1975 | Shurts |
| 6,881,800 | B2 | 4/2005 | Friedersdorf |
| 7,163,989 | B2 | 1/2007 | Friedersdorf |
| 7,650,930 | B2 | 1/2010 | Cheluget et al. |
| 8,067,512 | B2 | 11/2011 | Kiss et al. |
| 8,399,586 | B2 * | 3/2013 | Kiss et al. ..................... 526/348 |

FOREIGN PATENT DOCUMENTS

| | | |
|---|---|---|
| WO | WO 92/14766 | 9/1992 |
| WO | WO 94/00500 | 1/1994 |
| WO | WO 2011/087728 | 7/2011 |
| WO | WO 2013/137962 | 9/2013 |

\* cited by examiner

*Primary Examiner* — Fred M Teskin

(57) ABSTRACT

Provided are processes and apparatuses for continuous solution polymerization which can mitigate fouling during the production of propylene-based polymers.

9 Claims, 8 Drawing Sheets

US 8,916,659 B1

PROCESS AND APPARATUS FOR CONTINUOUS SOLUTION POLYMERIZATION

FIELD OF THE INVENTION

Described herein are processes and apparatuses for continuous solution polymerization and, in particular, processes and apparatuses for mitigating fouling during production of propylene-based polymers.

BACKGROUND OF THE INVENTION

Continuous solution polymerization processes generally involve the addition of catalyst to a monomer and solvent mixture. The mixture may be back-mixed giving a uniform polymer in an environment with substantially no concentration gradients. For example, WO 94/00500 describes a solution polymerization using a metallocene catalyst in continuous stirred tank reactors, which may be arranged in series, to make a variety of products.

In the course of the polymerization, typically, a predominant amount (over 50 mol % of the monomer or monomers) is consumed and the polymer formed is dissolved in the solvent. The higher the concentration of the polymer, the higher the viscosity of the polymerization reaction mixture containing the polymer, solvent, and unreacted components. The mixture passes from the polymerization reactor to a finishing section in which polymer, solvent, and unreacted monomer are separated. In the course of finishing, solvent and unreacted monomer are progressively removed from the polymerization mixture until only the polymer remains. The separated solvent and monomer can be recycled back to the polymerization reactor.

The heat of the polymerization reaction can be absorbed by cooling the polymerization mixture fed to the reactor. Alternatively, or in addition, the heat of reaction can be removed by a cooling system, such as by external cooling of the walls of the reactor vessel, or by internally arranged heat exchange surfaces cooled by a heat exchange fluid, or by an external heat exchanger through which the contents of the reactor are continuously circulated, or by an overhead condenser which constantly cools and condenses vapors rising from the reactor, or by a combination of these means.

U.S. Pat. No. 3,912,698 describes a polymerization process that produces a copolymer of ethylene and a C3-C7 alpha-olefin, with the copolymer containing 65-80 wt % ethylene. The process uses a heat exchanger for a liquid recycle stream to permit an increase in reactor capacity while reducing fouling in the context of a multiple flash to remove volatiles.

U.S. Pat. Nos. 6,881,800 and 7,163,989 describe a process and apparatus for the continuous solution polymerization of olefins including ethylene, propylene, and other olefin comonomers. The polymerization reaction takes place under pressure in one or more polymerization reactors, and then the effluent from the reactor or reactors is treated with a catalyst killer and then heated in one or more heat exchangers before being subject to a pressure drop which causes the effluent to phase separate into a polymer-rich phase and a polymer-lean phase. Those phases are separated, with the polymer-lean phase being purified and recycled to be used as solvent. The polymer-rich phase is subject to further separation and purification stages, including passage through a vacuum devolatilizer.

U.S. Pat. No. 8,067,512 provides monomer/solvent separation and recycle processes for continuous supercritical, solution and advanced solution polymerization processes for propylene-containing polymers and their blends. The process includes heating a polymer-lean recycle stream coming from a gravimetric separator positioned downstream of the reactor to form a heated polymer-lean recycle stream, and subsequently combining the heated polymer-lean recycle stream with the one or more homogenous reactor effluent streams to form a heated reactor effluent mixed stream. The heated reactor effluent mixed stream may then be passed through a pressure let-down valve followed and a gravimetric separator, such as to provide for reduced fouling propensity of the polymer-rich phase and sufficient heating of the polymer-rich phase to be able to pass through the remainder of the processing steps to form a propylene based polymer product without additional heat.

PCT Publication No. WO 2011/087728 discloses a plant for the continuous solution polymerization of one or more monomers in a solvent, e.g., a hydrocarbon solvent. The plant comprises a high pressure pump and at least one heat exchanger downstream of the pump. A feed is cooled by three heat exchangers which are refrigerated by means of a common three stage compressor. A method of defouling a heat exchanger is provided in which the level of liquid refrigerant in the heat exchanger is temporarily lowered.

Additional background references include U.S. Pat. No. 7,650,930, PCT Publication Nos. WO 92/14766, and WO 2013/137962.

As discussed above, in continuous solution polymerization processes, the reactor effluent is typically subjected to one or more separation steps in which solvent, residual monomer and other volatiles such as hydrogen are separated from the polymer solution. Generally, the solvent and monomer are recycled, with some heavy components, such as the catalyst solvent (e.g., toluene) and some light end contaminants, such as hydrogen, being permanently removed. The recycled solvent stream which is cooled prior to entering the reactor may contain a trace amount of polymer. However, even this trace amount of polymer can deposit on and consequently foul the solvent driers, heat exchangers, and other equipment through which the recycled solvent passes. This fouling can cause problems with equipment operability that ultimately affect overall process stability. Additionally, during the production of propylene-based polymers, additional fouling can occur when the recycled solvent stream is cooled to a point below the cloud point of the solution, as the propylene-based polymer can begin to precipitate out of the solution and cause fouling. Therefore, there remains a need for improved polymerization processes and apparatuses which reduce or mitigate the effects of such fouling during the production of propylene-based polymers.

SUMMARY OF THE INVENTION

Provided are processes and apparatuses for continuous solution polymerization of one or more olefin monomers. The processes and apparatuses may be useful in mitigating fouling during production of propylene-based polymers.

Provided herein is a plant for continuous solution polymerization of a feed comprising one or more olefin monomers and a solvent. The plant may comprise: a reactor; blending means to blend one or more olefin monomers and a solvent to produce a feed for the reactor; a pump for pressurizing the feed; and one or more heat exchangers for cooling the feed prior to entry into the reactor. At least one heat exchanger may be located downstream of the pump such that when the feed enters the pump it is at a temperature above the cloud point of the polymer produced in the reactor.

Also provided is a continuous solution polymerization process. The process may comprises pressurizing a feed comprising one or more olefin monomers and a solvent and then cooling the pressurized feed in at least one heat exchanger downstream of the pump prior to being polymerized in a reactor downstream of the heat exchanger. In the process the when the feed enters the pump it is at a temperature above the cloud point of the polymer produced in the reactor.

Also provided is a plant for continuous solution polymerization of a feed comprising one or more olefin monomers and a solvent. The plant may comprise: a reactor; feed blending means to prepare a feed comprising one or more olefin monomers in a solvent and means to supply to the reactor the feed and a catalyst to form therein a polymer-containing reactor mixture; downstream of the reactor, separation means for separating the polymer from the unreacted monomer and the solvent; apparatus for recycling the solvent back through the feed blending means and to the reactor including a pump for pressurizing the solvent and one or more heat exchangers for cooling the solvent prior to re-use; wherein at least one heat exchanger is located downstream of the pump, wherein the solvent enters the pump at a temperature above the cloud point of the polymer produced in the reactor.

Also described herein is a method for de-fouling a pump in a plant for continuous solution polymerization of a feed comprising one or more olefin monomers in a solvent, wherein the feed comprising one or more olefin monomers in a solvent is polymerized to provide a polymer-containing polymerization reaction mixture from which the solvent and residual monomer are separated, and the solvent is recycled through an apparatus which includes a pump for pressurizing the solvent and one or more heat exchangers for cooling the solvent prior to entry into the reactor, the method comprising: passing the solvent first through a pump for pressurizing the solvent, and then through at least one heat exchanger downstream of the pump for cooling the solvent prior to re-use; wherein the solvent enters the pump at a temperature above the cloud point of the polymer produced in the reactor.

Preferably, in the plants and processes described herein the total differential head of the pump stays substantially the same during the continuous solution polymerization process.

Preferably the plants and processes described herein are used to produce a propylene-based polymer. The propylene-based polymer may comprise at least about 60 wt % propylene-derived units and about 5 to about 25 wt % ethylene-derived units, based on total weight of the propylene-based polymer, and may have a heat of fusion of less than about 80 J/g.

DETAILED DESCRIPTION OF THE INVENTION

Figure 1:
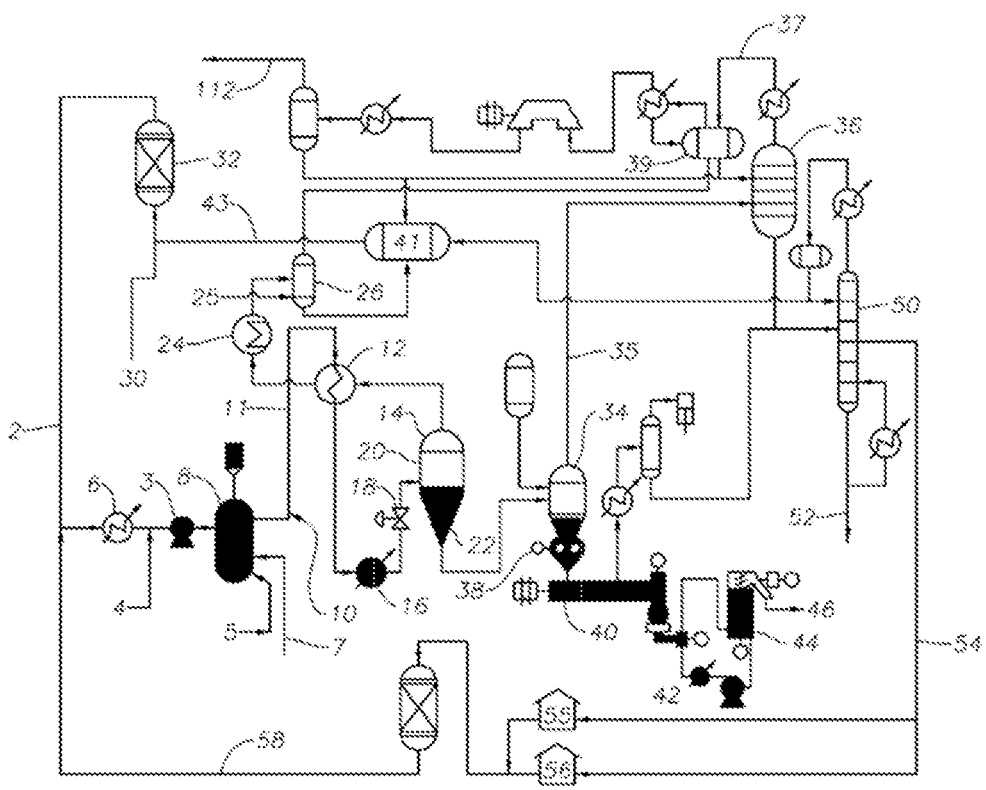
FIG. 1 depicts a schematic layout of a plant for olefin polymerization.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

As used herein, a "polymer" may be used to refer to homopolymers, copolymers, interpolymers, terpolymers, etc.

As used herein, when a polymer is referred to as comprising a monomer, the monomer is present in the polymer in the polymerized form of the monomer or in the derivative form of the monomer. As used herein, when a polymer composition or blend is said to comprise a certain percentage, wt %, of a monomer, that percentage of monomer is based on the total amount of monomer units in all the polymer components of the composition or blend.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

As used herein, "plastomer" shall mean ethylene based copolymers having a density in the range of about 0.85 to 0.915 g/cm3 ASTM D 4703 Method B and ASTM D 1505. The plastomers described herein may exhibit a MFR of from about 0.5 to about 30 g/10 min. Plastomers described herein include copolymers of ethylene derived units and higher α-olefin derived units such as propylene, 1-butene, 1-hexene, and 1-octene.

As used herein, unless specified otherwise, the term "copolymer(s)" refers to polymers formed by the polymerization of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "ethylene-based polymer(s)" refers to polymers containing at least about 50 wt % ethylene-derived units.

As used herein, the term "propylene-based polymer(s)" refers to polymers containing at least about 50 wt % propylene-derived units.

As used herein, a solution of "trace" polymers refers to polymers present in the solution at a very small amount of less than about 0.5 wt %, less than about 0.1 wt %, less than 0.05 wt %, or less than 0.01 wt %, based on total weight of the solution.

As used herein, "total differential head" of a pump refers to the pressure differential between the total discharge head and the total suction head of the pump. The total differential head may serve as an indicator of pumping efficiency which would be reduced in cases of pump fouling.

As used herein, when the total differential head of the pump is referred to as staying "substantially" the same, it means that at least about 90%, at least about 92%, at least about 94%, at least about 96%, or at least about 98%, of the original total differential head is maintained at the end of an observed time period during continuous solution polymerization.

As used herein, "polymerization" encompasses any polymerization reaction such as homopolymerization and copolymerization. It's defined to be a reaction system involving monomer(s), comonomer(s), polymer(s), optional inert solvent(s)/diluent(s), and optional scavenger(s).

As used herein, by "continuous" is meant a system that operates (or is intended to operate) without interruption or cessation. For example, a continuous process to produce a polymer would be one where the reactants are continually introduced into one or more reactors and polymer product is continually withdrawn.

As used herein, "solution polymerization" refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below its supercritical or pseudo supercritical temperature, thus, solution polymerizations are performed below the supercritical temperature and/or pressure of the system. Conventional solution polymerization processes typically operate with more than 65 wt % inert solvent present in the polymerization system at pressures below 13 MPa (1885 psi) and temperatures between 40 and 160° C.

Polymerization and Initial Separation of Polymer and Solvent

With reference to FIG. 1, a plant for continuous solution polymerization may be arranged as follows. A feed for polymerization is passed through conduit 2, a chiller or cooler 6, a centrifugal pump 3, into a polymerization reactor 8. The feed may contain: A) isohexane as solvent, B) monomer, generally the predominant monomer is ethylene or propylene, with propylene being preferred in the processes described herein, and optionally C) comonomer which may be any copolymerizable alpha-olefin, and optionally D) a diene or other polyene or cyclic copolymerizable material. The feed is passed through a chiller or cooler 6 in which the feed is optionally chilled to a low temperature for subsequent adiabatic polymerization in a continuous stirred tank reactor 8. In some embodiments, two or more continuous stirred tank reactors may be operated in series or parallel (however, for simplicity, only one reactor is depicted in FIG. 1). Activator and metallocene catalyst may be premixed and added through conduits 5 and/or 7 to one or more reactors 8. A scavenger, generally in the form of an alkyl aluminum such as tri-isobutyl aluminum or tri-n-octyl aluminum, may be added through conduit 4 to minimize the impact of poisons in the feed and in the reactor on the catalyst activity.

To complement the molecular weight control provided by controlling the polymerization temperature, hydrogen may be added to one or both reactors 8 through conduits (not shown).

The polymer-containing polymerization mixture, which emerges from the reactors 8 through a conduit 11, may first be treated with a catalyst killer, for example with water and/or methanol, added at 10 in a molecular solution in isohexane solvent to terminate the polymerization reaction.

A heat exchanger 12 may be arranged as part of a heat integrating arrangement and heated by a polymer-lean phase emerging from an upper layer 20 in a liquid phase separator 14, and provide an initial increase in the temperature of the polymer-containing polymerization reactor effluent in the conduit 11. A trim heat exchanger 16, which may be heated by steam, hot oil or other high temperature fluid, further increases the temperature to a level suitable for liquid phase separation. The solution then passes through a let-down valve 18 where a pressure drop is created which causes the separation of the polymer-containing polymerization reactor effluent into the polymer-lean phase 20 and a polymer-rich phase 22 below it.

The lean phase 20, after being cooled by the heat exchanger 12, may be cooled further by a cooling device 24, and pass through a surge tank 26 adapted for stripping out containments, such as hydrogen. Fresh monomer or comonomer may be added through conduit 25 and used as stripping vapor in the surge tank 26. The cooled lean phase may pass to collector 41 and then through conduit 43, and may be passed to dryer 32. Fresh feed of solvent and monomer 30 may be added to conduit 43 to provide the desired concentrations for the polymerization reaction. The dryer may be used to remove any unreacted methanol used as the catalyst killer or other containments present in the fresh feed supplied or any impurity in the recycled solvent and monomer. The recycle feed from the dryer 32 may then be passed through conduit 2 back to the polymerization reactor 8.

The vapor from the conduit at the top of the vessel 26 may be routed to a reflux drum 39 of tower 36. The vapor may be processed to recover valuable components, such as monomers such as ethylene and propylene, by fractionating tower 36 and its overhead vapor compression/condensation system. The recovered components may be recycled through conduit 43 to the inlet side of the drier 32.

The concentrated polymer-rich phase 22 may be passed to a low-pressure separator 34 where evaporated solvent and monomer are separated from the more concentrated polymer solution emerging from the liquid phase separator 14.

The evaporated solvent and monomer phase may be passed through conduit 35 in a vapor phase to the purification tower 36 operating by distillation to separate a light fraction of the highly volatile solvent and unreacted ethylene and propylene from the heavier less volatile components such as hexane and any toluene used to dissolve catalyst or activator and unreacted diene type comonomers. The light fraction may pass from the purification tower 36 through conduit 37 to reflux drum 39. The part mainly comprising hydrogen and any other non-condensables may be flared at 112.

A gear pump 38 may convey the concentrated polymer to a vacuum devolatilizing extruder or mixer 40, where again a vapor phase is drawn off for purification, condensed and then pumped to a purification tower 50. A heavy fraction of toluene 52 used as catalyst solvent and any comonomers used, such as ethylene norbornadiene (ENB) comonomer or 1-octene comonomer, are recovered by this purification tower 50. The ENB or octene can be recycled through outlet 54. Alternative heavy comonomers, such as ENB and octene, may thereby be stored in separate storage vessels 55, 56. The comonomers, such as ENB and octene, may then be recycled from storage vessels 55 and 56 through conduit 58 to feed the chiller or cooler 6 for the polymerization reactor 8.

The polymer melt emerging from the vacuum devolatilizing extruder or mixer 40 can then be pelletized in an underwater pelletizer, fed with water chilled at 42, washed and spun dried at 44 to form pellets suitable for bagging or baling at 46.

The vapor from the devolatilizer 40 may be treated to recover and recycle the solvent. In some embodiments, the vapors may pass through a wash tower, a refrigerated heat exchanger and then through a series of compressors and pumps.

Polymerization of Different Polymers

The operation of the plant of FIG. 1 is further illustrated with reference to Table 1. Table 1 takes as examples polymerization processes to make: (1) a low molecular weight plastomer, (2) a higher molecular weight elastomer, and (3) a propylene-based polymer.

TABLE 1

Process Conditions of the Plant/Process in Varying Operating Modes

| Polymers Produced | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Plastomer | 50 or down to −15° C.; 120 bar total; 50 bar monomer partial pressure | 130 to 200° C.; 100 to 130 bar; 7 to 22 wt % polymer | 220° C.; 100 to 130 bar; 15 to 22 wt % polymer | 220° C.; 30 to 45 bar; 15 to 22 wt % polymer | 220° C.; 30 to 45 bar; <0.3 wt % polymer | 220° C.; 30 to 45 bar; 25 to 40 wt % polymer |
| Elastomer | 50 or down to −15° C.; 120 bar total; 50 bar monomer partial pressure | 85 to 150° C.; 100 to 130 bar; 8 to 15 wt % polymer | 220° C.; 100 to 130 bar; 8 to 15 wt % polymer | 220° C.; 30 to 45 bar; 8 to 15 wt % polymer | 220° C.; 30 to 45 bar; <0.3 wt % polymer | 220° C.; 30 to 40 bar; 20 to 40 wt % polymer |
| Propylene-based Polymer | 50 or down to −35° C.; 120 bar total; 50 bar monomer partial pressure | 50 or 80° C.; 100 to 130 bar; 5 to 15 wt % polymer | 200° C.; 100 to 130 bar; 5 to 15 wt % polymer | 200° C.; 30 to 45 bar; 5 to 15 wt % polymer | 200° C.; 30 to 45 bar; <0.3 wt % polymer | 220° C.; 30 to 45 bar; 25 to 40 wt % polymer |

With reference to FIG. 1 and Table 1, plastomers can be made using the processes described herein. For example, the temperature of the feed being introduced into the reactor 8 can be reduced by the chiller 6 to a temperature of 50° C. to −15° C., for example about 0° C. The pressure of the feed may be raised by the centrifugal pump 3 to about 120 bar. The feed comprising largely solvent and up to about 50 bar partial pressure of ethylene and a comonomer, such as for example butene, hexene, or octene, then enters the reactor 8 (or first of two series reactors if two reactors are used). Catalyst and activator is added to the reactor 8 in amounts to create the desired polymerization temperature which in turn is related to the desired molecular weight. The heat of polymerization increases the temperature to about 130° C. to 200° C., or about 150° C. to about 200° C. The plastomer may be formed with or without the use of hydrogen. At the outlet of the second series reactor, the polymer concentration may be in the range of from 7 wt % to 22 wt %, or from 15 to 22 wt %. The heat exchanger 12 may be used to raise the temperature initially and then the further heat exchanger 16 may cause a further temperature rise to about 220° C. A rapid pressure drop results as the polymerization mixture passes through the let-down valve 18 into the liquid phase separator, with the pressure dropping quickly from about a pressure in the range of about 100 to 130 bar to a pressure in the range of about 30 to 45 bar. In an embodiment, the pressure differential between the outlet of the pump 3 and the outlet of the let-down valve 18 is solely responsible for causing the feed and the polymerization mixture to flow through the reactor 8 and the conduit 11 including the heat exchangers 12 and 16. Inside the separator 14 an upper lean phase is formed with less than about 0.3 wt % polymer, or less than about 0.1 wt % of polymer, and a lower polymer rich phase with about 25 to 40 wt % polymer, or from about 30 wt % to 40 wt % of polymer. Further removal of solvent and monomer from the polymer rich phase may occur in the low-pressure separator 34 and the extruder 40. Polymer can be removed from the plant containing less than 1 wt %, preferably with 0.3 wt % or less, even more preferably less than 0.1 wt % of volatiles, including water. Other general conditions for producing plastomers are described in WO 1997/22635 and WO 1999/45041.

With reference to FIG. 1 and Table 1, elastomers can be made using the processes described herein. As seen in Table 1, while the polymerization temperature may be lower for the production of elastomers than for plastomers, and the polymer concentration emerging from the reactor may also lower (however the viscosity of the polymer concentration will be similar to that for plastomers), the same separation processes and plant can be used to produce elastomers as well as plastomers. General conditions for producing elastomers using two reactors in series are described in WO 99/45047. Typically, in a series reactor process the first reactor may operate at temperatures between 0° C. to 110° C., or between 10° C.

and 90° C., or between 20° C. and 79° C., and the second reactor may operate between 40° C. to 140° C., or between 50° C. to 120° C., or between 60° C. to 110° C.

Processes and conditions for producing propylene-based polymers are also found with Reference to FIG. 1 and Table 1. General conditions for producing propylene-based polymers are also described in WO 00/01745. For example, the polymerization temperature may vary between about 20° C. to about 80° C., or from about 28° C. to about 70° C.

Fouling Mitigation

Polymer solutions typically possess a cloud point, which is the temperature below which incipient polymer precipitation (clouding) is observed in a quiescent solution. Pumps used in polymerization processes begin to foul when exposed to a stream of polymer-lean solution chilled below the cloud point of the polymer. Thus, the plant and processes described herein may be useful in reducing pump fouling by arranging a pump upstream of at least one heat exchanger in the feed/solvent recycling system. For example, a pump may be placed upstream of a heat exchanger in the reactor feed (solvent recycling) system and the feed (solvent) may be passed through the pump at a temperature above the cloud point of the polymer. This reduces the precipitation of trace amounts of the polymer in the recycled solvent stream, and in turn, alleviates the fouling that occurred when the polymer-lean solution was cooled below the cloud point of the polymer.

The fouling mitigation may be particularly useful when producing propylene-based polymers, as when compared to the production of ethylene-based polymers, there is an additional fouling source during the production of propylene-based polymers. Propylene-based polymers typically have a slower rate of crystallization as compared to ethylene-based polymers, which can lead to additional fouling in the polymerization process.

Provided herein is a plant for continuous solution polymerization of a feed comprising one or more olefin monomers and a solvent. The plant may comprise a reactor, blending means to blend one or more olefin monomers and a solvent to produce a feed for the reactor, a pump for pressurizing the feed, and one or more heat exchangers for cooling the feed prior to entry into the reactor. At least one heat exchanger may be located downstream of the pump such that when the feed enters the pump it is at a temperature above the cloud point of the polymer produced in the reactor. That is, the feed may pass through the pump at a temperature above the cloud point of the polymer, and then pass to the heat exchanger to be cooled before being fed to the reactor.

The one or more heat exchangers may be cooled with cooling water and may be connected to a supply of cooling water. Cooling with ordinary cooling water can be the least expensive method of achieving reactor feed cooling. Thus, in some embodiments, the cooling of the solvent or the monomers or a combination of monomer and solvent can be achieved using a heat exchanger cooled with cooling water, before being cooled to further lower temperatures using refrigerated heat exchangers. In such embodiments, the location of the at least one heat exchanger downstream of the pump enables the feed to be cooled to a temperature approaching that of the cooling water.

In some embodiments, at least one heat exchanger downstream of the pump is refrigerated. Optionally, each of the heat exchangers for cooling the feed is refrigerated. The refrigerant may be any suitable refrigerant. Optionally, the refrigerant is propylene. The level of the liquid refrigerant in the heat exchanger shell is optionally lowered by closing an inlet of liquid refrigerant into the shell and allowing the liquid refrigerant in the shell to boil off. The level of liquid refrigerant is optionally reduced until the temperature of the feed entering the reactor or reactors reaches a certain predetermined limit. Optionally, the level of liquid refrigerant in the shell is lowered to expose both the upper and the lower array of tubes as mentioned above. The lowering of liquid refrigerant in the shell may be temporary. In some embodiments, at least one of the heat exchangers is a fin-fan cooler wherein the reactor feed, meaning the solvent or the monomers or a combination of monomer and solvent, exchanges heat with ambient air that is forced over a bank or more of finned tubes. This method may be especially useful when cooling water is scarce or the humidity is high so as to make cooling towers less effective.

The at least one refrigerated heat exchanger downstream of the pump may be a tube-in-shell heat exchanger. In some embodiments, the tubes may have an outer diameter of ¾ inch (1.91 cm), for example, in the range of from 17 to 21 mm. The tubes may be selected to have a given wall thickness which is commensurate with the pressure that the tube needs to withstand.

In some embodiments, a heat exchanger may be used that has an upper array of horizontally-arranged tubes and a lower array of horizontally-arranged tubes arranged below the upper array with the recycle stream of solvent (and optionally residual monomer) passing first through the upper array and into the lower array. As the recycle stream passes first through the upper array, fouling by traces of polymer present in the recycle solvent will occur preferentially in the upper array of tubes. When it is desired to defoul the heat exchanger, for example, because of the pressure drop across the heat exchanger rises to a predetermined level, the supply of refrigerant to the shell may be reduced or cut off entirely so that the level of refrigerant in the shell decreases to expose the upper array of tubes. That upper array of tubes is then no longer cooled so efficiently by the refrigerant and in consequence the temperature of the upper array of tubes and the liquid therein rises. That rise in temperature causes the polymer deposited in those tubes to re-dissolve in the recycle solvent thereby defouling the heat exchanger.

The heat exchanger may be of any suitable configuration. The tubes may pass straight through the shell, that is, they may enter at one end of the shell and extend through the entire length of the shell, exiting the shell at the other end. However, in a preferred embodiment the tubes are U-tubes having an entry and an exit at the same end of the shell. In a preferred embodiment, the heat exchanger is a four-pass heat exchanger, that is, the recycle liquid comprising solvent (and optionally residual monomer) travels along the length of the shell four times. For example, when the heat exchanger is four-pass U-tube heat exchanger, the recycle liquid will enter the upper array of tubes and travel down the U-tubes in one direction and that back again and will then flow into the lower array of tubes and travel once more down the length of the U-tubes and back again.

The heat exchanger(s) downstream of the pump are capable of operating at the pressures of the feed downstream of the pump, for example, they are capable of operating at pressures of 75 bar or more, or 80 bar or more, or 90 bar or more, or 95 bar or more, or 120 bar or more.

The at least one heat exchanger downstream of the pump may reduce the temperature of the feed to a temperature in the range of from 40° C. to −42° C., or from 0° C. to −40° C., or from −10° C. to −35° C., or from −38° C. to −41° C.

The plant comprises one or more pumps upstream of the reactor or reactors to raise the pressure of the feed to the required level. Optionally, the feed supply line to each reactor includes a pump, for example, a centrifugal pump for raising the pressure of the solvent to the required level (optionally, the solvent contains recycled residual monomer) and separate pumps, for example diaphragm pumps, for raising the pressure of each fresh monomer to the required level, with the solvent and monomers being combined downstream of the pumps. However, preferably the monomer and comonomers are combined with the solvent upstream of the pump so that the combined feed can be raised to the required pressure by a single pump, thereby avoiding the need for separate diaphragm pumps for the monomers and comonomers. Optionally, the single pump is a centrifugal pump. Of course, when there are two reactors, each reactor is provided with a separate pump for raising the feed to that reactor to the required pressure. This approach has particular advantages where the ethylene supplied to the plant is at low pressure because ethylene dissolves readily in hydrocarbon solvents, such as isohexane and n-hexane, and therefore this method avoids the necessity for a separate pump or pumps or compressors to pump the ethylene up to the required pressure. The ethylene may be mixed into the solvent stream by any suitable means. For example, the ethylene may be sparged into a conduit carrying the solvent. The sparging may be via a single sparge outlet or is preferably via two or more sparge outlets. The sparge outlets should be placed far enough upstream of the pump, for example at least 5, preferably at least 10 meters upstream of the pump in order that the ethylene is fully dissolved before reaching the pump suction. Where there is more than one pump the references herein to the pump should be understood to refer to the most downstream of the pumps before the reactor, unless another meaning is clear from the context. In some embodiments, the pump is a multi-stage centrifugal pump.

The pump may raise the feed to a pressure of 75 bar or more, or 80 bar or more, or 90 bar or more, or 95 bar or more, or 120 bar or more.

The feed may increase in temperature by at least 1° C., or at least 2° C., or at least 3° C., or at least 10° C. as it passes through the pump.

The means to supply a feed of one or more olefin monomers in a solvent may be any suitable apparatus but will typically include a conduit for the supply of each of the monomers to a common feed conduit, a conduit for the supply of recycled solvent (often also containing some residual monomer), a conduit for the supply of fresh solvent and a pump or pumps for pumping the feed to the reactor or reactors, and for pressurizing the feed to the desired pressure.

In the plant and process described above, at least the final heat exchanger is downstream of the pump and therefore it is possible to have a feed at a temperature above the cloud point of the propylene-based polymer produced when entering the pump and further cooled in at least one heat exchanger downstream. As described herein, it has surprisingly been found that the pump can foul when exposed to a feed cooled below the cloud point of the polymer produced. Thus, to reduce pump fouling by elevating or maintaining the temperature of the feed entering the pump to above the cloud point of the propylene-based polymer being produced, it is desirable to have a heat exchanger downstream of the pump for cooling the feed out of the pump (as opposed to before the pump) to the desired temperature for the polymerization. In addition, the temperature rise caused by the action of the pump on the feed, which may be in the region of 3° C. or more, can be countered by the refrigerated heat exchanger downstream of the pump. For example, using propylene as a refrigerant, the lowest temperature which can be reached in a refrigerated heat exchanger without reducing the pressure of the propylene below atmospheric pressure is about −41.7° C. Thus, in an arrangement where the pump is downstream of the final refrigerated heat exchanger, the lowest practicable feed temperature at the reactor inlet would therefore be about −38° C. to −39° C., assuming that the pump raised the feed temperature by about 3° C. In the plant and apparatus described herein however, the final heat exchanger is downstream of the pump, and thus can reduce the temperature of the feed going into the reactor to a yet lower temperature, for example of about −41° C., thereby allowing an increase in the polymerization production rate in the reactor.

The feed comprising one or more olefin monomers and a solvent is pressurized by a pump to a pressure of at least 20 bar, or at least 50 bar, or at least 75 bar, or at least 100 bar and is then cooled in at least one heat exchanger located downstream of the pump, prior to being polymerized in a reactor downstream of the at least one heat exchanger. In some embodiments, the feed enters the pump at a temperature above the cloud point of the polymer to be produced, and is pressurized by a pump to a pressure of at least 75 bar, is then cooled in at least one refrigerated heat exchanger downstream of the pump, optionally to a temperature of from 40° C. to −42° C., or from 0° C. to −40° C., or from −10° C. to −35° C., or from −38° C. to −41° C., prior to being polymerized in a reactor downstream of the refrigerated heat exchanger. The feed temperature may vary depending on the available exotherm and extent of monomer conversion desired to reach the polymerization temperature. Alternatively, in some embodiments, the feed temperature can be above 0° C., for example, at ambient temperature e.g., around 30° C. or even higher. In those embodiments, the heat exchangers for cooling the feed can be fed with cooling water, rather than being refrigerated, thereby reducing cost. The higher temperature of the solvent recycle may also avoid problems caused by fouling with polymer. However an increase in the feed temperature will result in a decrease in the amount of polymer made in the reactors for any given total reactor feed rate, for an adiabatic process.

Monomer concentration depends on the target polymer type and molecular weight, the associated conversions of monomer to polymer and operating temperature. Advantageously, the monomer partial pressure should be 30% or more of the total partial pressure of volatile components in the polymerization reactors; especially 40% or more, and should preferably not exceed 80%, 70% or especially 60%. The total partial pressure of all components should be less than 100% of the reactor pressure to avoid formation of vapor bubbles. In general, higher monomer partial pressures are preferred to improve the liquid phase separation in the liquid phase separator.

The solvent may be a hydrocarbon solvent or a non-hydrocarbon solvent. Preferably, the solvent is a hydrocarbon solvent. More preferably, the solvent comprises isohexane or comprises hexane. Some known continuous olefin polymerization processes utilize n-hexane as solvent. However, n-hexane is associated with health concerns and therefore it is preferred to use isohexane as a solvent. Isohexane has a slightly unfavorably heat capacity relative to n-hexane and therefore it is necessary to use 1 or 2% more isohexane as compared to n-hexane to remove an equivalent amount of heat of reaction.

The reactor arrangement of the present invention may be single reactor or a plurality, such as two, reactors arranged in series, or optionally in parallel. Each reactor is optionally a continuous stirred tank reactor. In some embodiments, the polymerization plant may have two reactors, a primary reactor and a secondary reactor, arranged to operate in series or in parallel. Optionally, the feed supply to each reactor has its own pump and may include at least one refrigerated heat exchanger located downstream of the respective pump. In some embodiments, the feed supply to one reactor has a cooling water cooled heat exchanger located upstream of the pump while the feed supply to the second reactor has a cooling water cooled heat exchanger located downstream of the pump. In some embodiments, the cooling system for the feed to one reactor has a cooling water cooled heat exchanger and a refrigerated heat exchanger located downstream of the pump and the cooling system for the other reactor has only a cooling water cooled heat exchanger located upstream of the pump, i.e., with no heat exchanger downstream of the pump.

In some embodiments, the polymerization plant comprises a) a primary reactor and a primary feed line for supplying a primary feed to the primary reactor, where the primary feed line comprises a first pump for compressing the primary feed to at least 75 bar, first and second refrigerated heat exchangers arranged upstream of the first pump and downstream of the feed blending means, and a third refrigerated heat exchanger located downstream of the first pump and upstream of the primary reactor; and b) a secondary reactor and a secondary feed line for supplying a secondary feed to a secondary reactor, where the secondary feed line comprises a second pump for compressing the secondary feed to a pressure of at least 75 bar, a fourth refrigerated heat exchanger located upstream of the second pump and downstream of the feed blending means, and a fifth refrigerated heat exchanger located downstream of the second pump and upstream of the secondary reactor.

The polymerization plant may comprise a common first pump for raising the pressure of a mixture of solvent and recycled solvent with residual dissolved monomers to a pressure of about 75 bar or more followed by a water cooled heat exchanger to cool this mixture to a temperature of 45° C. or lower and then followed by a bed containing dessicants to remove any moisture or other catalyst poisons. The stream may then be split into a first stream destined for the primary reactor and a second stream destined for the secondary reactor. Means are provided for mixing additional monomers at the requisite proportion to each reactor into their respective stream of solvents to give a first feed and a second feed. The first feed for the primary reactor may be further pumped up to a pressure adequate to enter the primary reactor, for example of 120 bar or more, which may result in a temperature rise of approximately 15° C., for example from 39° C. to 55° C. The feed may then be cooled first with a cooling water exchanger to a temperature of no more than 45° C., or no more than 40° C., and then be further cooled with a refrigerated heat exchanger to a temperature of no more than 35° C., or no more than 30° C., or no more than 20° C., prior to entry into the primary reactor. The second feed for the secondary reactor is first cooled in a heat exchanger with cooling water as the coolant to a temperature of no more than 40° C., or no more than 30° C., and may then be raised to the requisite pressure to enter the reactor, for example 120 bar or more, which may result in a warming of the feed by about 5° C., for example to a temperature in the range of from 40° C. to 45° C.

In conventional plants designed to operate primarily with two reactors in series, often both reactors are of equal size. However, when used in parallel configuration to make a blend of two different polymers having a major component and a minor component, such as 90:10 blend, it has been found that the residence time of the reaction in the secondary reactor has to be relatively long, which can make that reactor difficult to control and sluggish to respond to changes in conditions. Therefore, often when two reactors are operated in parallel, a reactor arrangement is used in which one reactor (the primary reactor) is larger than the other (the secondary reactor). Such an arrangement has the advantage that when used as parallel reactors for preparing, say, a 90:10 by weight blend of two different copolymers, the minor component can be prepared in the secondary reactor and the residence time of the reaction in the secondary reactor may be maintained at a manageable level. Furthermore, the smaller size of the secondary reactor can allow for a reduction in the cost of building the plant, whilst the larger primary reactor is available for making single component polymer products.

The polymerization temperature is constrained by the molecular weight desired, allowing for the influence of any hydrogen added. In a series reactor process the temperature in the successive reactors can be raised progressively in increments depending on the nature of the polymerization taking place in such reactors. The temperature should not exceed the polymerization decomposition temperature or the temperature at which the catalyst can sustain the polymerization reaction.

Overall the exotherm may lead to a temperature differential between the inlet temperature of the polymerization reactor and the outlet of from 50 to 220 or up to 250° C. For example, by feeding at minus 40° C. and allowing the exotherm to raise the temperature to 210° C., a highly efficient process may result for producing lower molecular weight polymers. For higher molecular weight polymers, the temperature raise may need to be constrained via increased and warmer feed and/or lower reactor temperatures to avoid excessive viscosity in the reactor solution that would degrade reactor mixing performance, thereby leading to non-uniform polymers.

The ratio of the volume of the primary reactor to the volume of the secondary reactor may be in the range of from 65:35 to 90:10, or from 70:30 to 90:10.

The polymerization plant may be suitable for the continuous adiabatic solution polymerization of olefin monomers. For example, the primary and secondary reactors may be continuous stirred tank reactors.

In some embodiments, the residence time of the primary polymer-containing polymerization reaction mixture in the primary reactor is in the range of from 3 minutes to 90 minutes, or in the range of from 3 minutes to 30 minutes. The residence time of the secondary polymer-containing polymerization reaction mixture in the secondary reactor may be in the range of from 3 minutes to 90 minutes, or in the range of from 5 to 30 minutes.

The ratio of polymer production rate in the primary reactor to polymer production rate in the secondary reactor may be in the range of from 60:40 to 95:5, or from 65:35 to 90:10, or from 70:30 to 90:10.

The polymerization processes described herein can be performed with any suitable catalyst, for example, a Ziegler Natta catalyst or a single sited catalyst (SSC). Preferably, a SSC is used. These generally contain a transition metal of Groups 3 to 10 of the Periodic Table; and at least one ancillary ligand that remains bonded to the transition metal during polymerization. Preferably the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands as described in more detail hereafter.

The catalyst is preferably a bulky ligand transition metal catalyst. The bulky ligand contains a multiplicity of bonded atoms, preferably carbon atoms, forming a group, which may be cyclic with one or more optional hetero-atoms. The bulky ligand may be metallocene-type cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group 4, 5 or 6 transition metal of the Periodic Table of Elements. The transition metal atom is preferably a Group 4 atom.

The SSC may be selected from among a broad range of available SSC's to suit the type of polymer being made and the process window associated therewith in such a way that the polymer is produced under the process conditions at an activity of at least 40,000 g polymer per gram SSC (such as a metallocene), preferably at least 60,000 or even in excess of 100,000 g polymer per gram SSC. By enabling the different polymers to be produced in different operating windows with an optimized catalyst selection, the SSC and any ancillary catalyst components can be used in small quantities, with optionally also using small amounts of scavengers. The killer can be used in equally small amounts and the various cost-effective methods can then be introduced to allow the non-polar solvent to be recycled and subjected to treatment to remove polar contaminants before re-use in the polymerization reactor(s).

Metallocene catalysts can be used with a cocatalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

A metallocene may be also be used with a cocatalyst which is a non- or weakly coordinated anion. The term "non-coordinating anion" as used herein includes weakly coordinated anions. The coordination should be sufficiently weak in any event, as evidenced by the progress of polymerization, to permit the insertion of the unsaturated monomer component. The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP 0277003 and EP 0277004. The precursor cation may be a triphenylcarbonium derivative.

The non-coordinating anion can be a halogenated, tetra-aryl-substituted Group 10-14 non-carbon element-based anion, especially those that are have fluorine groups substituted for hydrogen atoms on the aryl groups, or on alkyl substituents on those aryl groups.

The effective Group 10-14 element cocatalyst complexes of the present invention are, in a preferable embodiment, derived from an ionic salt, comprising a 4-coordinate Group 10-14 element anionic complex, where A⁻ can be represented as:

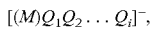
$[(M)Q_1Q_2 \ldots Q_i]^-$, where M is one or more Group 10-14 metalloid or metal, preferably boron or aluminum, and each Q is a ligand effective for providing electronic or steric effects rendering [(M') $Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof.

The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

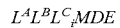
$L^A L^B L^C_i MDE$ where, $L^A$ is a substituted cyclopentadienyl or hetero-cyclopentadienyl ancillary ligand π-bonded to M; $L^B$ is a member of the class of ancillary ligands defined for $L^A$, or is J, a hetero-atom ancillary ligand 6-bonded to M; the $L^A$ and $L^B$ ligands may be covalently bridged together through a Group 14 element linking group; $L^C$, is an optional neutral, non-oxidizing ligand having a dative bond to M (i equals 0 to 3); M is a Group 4 or 5 transition metal; and, D and E are independently mono-anionic labile ligands, each having a 6-bond to M, optionally bridged to each other or $L^A$ or $L^B$. The mono-anionic ligands are displaceable by a suitable activator to permit insertion of a polymerizable monomer or macromonomer can insert for coordination polymerization on the vacant coordination site of the transition metal component.

Representative non-metallocene transition metal compounds usable as SSC's also include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Additional organometallic transition metal compounds suitable as olefin polymerization catalysts in accordance with the present invention will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred are metallocenes which are biscyclopentadienyl derivatives of a Group 4 transition metal, preferably zirconium or hafnium, for example, as disclosed in PCT Publication No. WO 9941294. These may advantageously be derivatives containing a fluorenyl ligand and a cyclopentadienyl ligand connected by a single carbon and silicon atom, for example, as disclosed in PCT Publication Nos. WO 99/45040; and WO 99/45041. More preferably, the Cp ring is unsubstituted and/or the bridge contains alkyl substituents, suitably alkylsilyl substituents to assist in the alkane solubility of the metallocene.

Other suitable metallocenes may be bisfluorenyl derivatives or unbridged indenyl derivatives which may be substituted at one or more positions on the fused ring with moieties which have the effect of increasing the molecular weight and so indirectly permit polymerization at higher temperatures such as described in EP 0693506 and EP 0780395.

When using the catalysts described above, the total catalyst system will generally additionally comprise one or more organometallic compounds as scavenger. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably, steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. No. 5,153,157, U.S. Pat. No. 5,241,025 and WO-A-91/09882, WO-A-94/03506, WO-A-93/14132, and that of WO 95/07941. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds is minimized during polymerization reactions to that amount effective to enhance activity (and with that amount necessary for activation of the catalyst compounds if used in a dual role) since excess amounts may act as catalyst poisons. A preferred scavenger is TNOA, which is preferably introduced neat, rather than in solution, to reduce cost and improve safety.

Preferably, a catalyst killer is added downstream of the reactor or reactors (in the case of series reactors that means that the killer is added downstream of the last polymerization reactor). Optionally, the catalyst killer is added upstream of a heating arrangement and a liquid phase separator to suppress further polymerization of the heated polymerization mixture undergoing separation, the lean phase being passed through a cooling apparatus, which may comprise a heat integrating exchanger and a final cooler, and optionally a drier back to the inlet side of the pump; the polymer-rich phase being subjected to additional solvent removal downstream to obtain a solid polymer.

The addition of the catalyst killer permits the temperature to be increased without risking further polymerization so facilitating direct recycle, after removal of any surplus killer, of separated solvent and monomer to the feed supply means on the inlet side of the pump. With term "direct" is meant that the lean phase generally does not need to be fractionated. Known catalyst killers include water and methanol.

In plants and processes for the continuous solution polymerization of olefins, the solvent and residual monomer is typically recycled back to the start of the process through a variety of purification and processing apparatus which includes at least one heat exchanger for reducing the temperature of the recycle fluid. However, the solvent, which typically comprises a small amount of residual monomer, also often includes a trace amount, for example, less than 0.5 wt %, of polymer. The polymer may be present for a variety of reasons. In plants having a liquid phase separator in which the effluent from the reactor is separated into two liquid phases, the polymer-lean phase is typically recycled back to the start of the process. That polymer-lean phase typically comprises a trace amount of polymer as mentioned above. In plants in which the separation is carried out using a series of flash vessels so that the solvent and the residual monomer are drawn off as a vapor phase, high flash drum velocities can result in trace amounts of polymer entering the recycled solvent. That trace of polymer present in the recycle stream can cause fouling of equipment in the recycling apparatus. For example, the recycling apparatus will typically comprise one or more drier beds for purification of the recycle stream and those drier beds can become fouled by residual polymer. Fouling also arises in refrigerated heat exchangers which are used to cool the recycle solvent and the feed prior to entry of the feed into the reactor arrangement. Specifically for production of propylene-based polymers, due to their relatively slow rate of crystallization by contrast with ethylene-based polymers, additional fouling would occur to the pump exposed to a solution of trace polymers cooled below the cloud point of the polymer, which is manifested as a constant reduction in total differential head of the pump at a constant volumetric pump throughput. In the present invention, the pump fouling is dealt with by placing the pump upstream of at least one heat exchanger and passing the solution of trace polymers through the pump at a temperature above the cloud point of the polymer. By virtue of the above, deposit of trace polymers on the pump can be significantly reduced or entirely eliminated, so that the total differential head of the pump would not suffer from any loss and achieves a steady state through the production process without periodic interruption with manual restoration of the pump discharge pressure.

The recycling apparatus for recycling the solvent back through the feed blending means into the reactor or reactors includes all of the apparatus through which the recycle solvent passes, including the feed blending means and the heat exchangers for cooling the feed prior to entry into the reactor. The apparatus may contain a heat exchanger upstream of the feed blending means as well as one or more heat exchangers downstream of the feed blending means and upstream of the reactor. Preferably, the heat exchanger upstream of the feed blending means has an upper array of horizontally-arranged tubes and a lower array of horizontally-arranged tubes arranged below upper array, both the upper array and the lower array being enclosed in a shell having an inlet and outlet for a liquid refrigerant and in which the solvent flows first through the upper array tubes and then through the lower array of tubes, the inlet being provided with a valve for reducing or preventing the flow of refrigerant into the shell such that, in use, the level of the refrigerant in the shell may be lowered to expose the upper of tubes.

Optionally, the plant and the process of the present invention comprise a pressure let-down device capable of reducing the pressure of the polymer containing reaction mixture to a pressure at which the mixture separates into a polymer-rich phase and a polymer-lean liquid phase and further comprises means for separating the polymer-lean liquid phase from the polymer-rich phase such that the polymer-lean liquid phase can be recycled as a recycle stream to the recycling apparatus.

Working pressures in the process can be 75 bar or more, 80 bar or more, 90 bar or more; 95 bar or more and especially 120 bar or more, or even 140 bar or more. The upper pressure limit is not critically constrained but typically can be 200 bar or less, preferably 140 bar or less, or 120 bar or less. The pressure should suffice to keep the reactor solution in a single phase up to the point of the pressure reducing means, and to provide the necessary working pressure to convey the fluids through the plant.

In some embodiments, use of a separate pump to boost the pressure of the viscous polymerization mixture between the reactor and the liquid phase separator can be avoided, as such pumps are much more costly than the low viscosity feed pump. The pressure of the pump also cascades through the process and combines with the absence of vaporization for the initial solvent separating stage to reduce overall pumping needs during finishing. The pressure of the pump advances the viscous polymerization mixture to the pressure reducing means upstream of the liquid phase separator without allowing phase separation prior to the pressure reducing means. In some embodiments, the pressure of the pump additionally advances one or both separated phases to further downstream fractionating systems or purification devices such as high pressure flash separation devices or low pressure flash separating devices. In other embodiments, there is no liquid phase separation and isolation of the polymer is achieved by vaporization of the volatiles in flash tanks or by other means.

Preferably, the liquid phase separator is connected to a flash tank, arranged downstream, which receives the polymer-rich phase from the liquid phase separator. Preferably, the flash tank operates at a pressure sufficient to allow feeding of the vapor phase to the fractionating and purification system without requiring a separate compressor, and said pressure is generally 2 bar gauge or more. In order to accommodate production of polymers with a wide range of molecular weights, this pressure in the flash tank can be raised to a high level, for example, between 3 and 10 barg, to adjust solution viscosity to facilitate feeding of the concentrated polymer solution to the final devolatizing stage. Thus, the volatile phase removed from a concentrated phase is optionally conveyed simply to a fractionating tower as a vapor, arranged downstream of the flash tank, for purification.

As general guidance when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 20 bar/second, preferably 30 bar/second or more, more preferably 40 bar/second or more, even more preferably 50 bar/second or more, assists in inducing disengagement of the two phases. This rapid pressure decrease preferably starts from a pressure above the binodal boundary or lower critical solution temperature (LSCT) and stops at a pressure below the spinodal boundary. The preferred phase separation is by spinodal decomposition and is called pressure induced phase separation (PIPS). Also the liquid phase separator should provide a sufficient residence time to permit the settlement of the lean and concentrated phase at the lower end of the separator.

In one embodiment, the lean phase is passed in liquid form to a means for removing hydrogen added to or generated during polymerization, which means comprises a means for contacting a stripping vapor with the lean phase in a countercurrent flow arrangement to concentrate the hydrogen in the vapor phase for removal from the lean phase recycle.

The stripping vapor preferably consists of a volatile monomer such as ethylene. The stripping vapor may be an inert gas such as nitrogen. The means may include a stripping vessel to remove hydrogen from the recovered solvent stream for use as the polymerization feed. The stripping vapor advantageously has a low hydrogen content, preferably below 5 mppm. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel without the aid of separate additional compression.

Molecular weight control may be exercised through control of hydrogen levels, which may be supplementary to control of molecular weight by control of the polymerization temperature.

Downstream of the liquid phase separator, the polymer-rich phase enters a flash tank operating at a pressure such that solvent and residual monomer vaporizes to leave a concentrated polymer phase. The concentrated polymer phase may, for example, comprise from 70 wt % to 95 wt % of polymer with the rest being volatiles such as solvent and residual monomers. The vapor is separated as an overhead stream from the flash tank and the concentrated polymer phase typically is collected in the bottom of the flash tank from where it passes through an outlet into a conduit and eventually flows to a vacuum devolatilizer.

The level of volatiles (typically residual solvent and monomer), present in the concentrated polymer phase immediately downstream of the flash tank is optionally less than 30 wt %, or than 25 wt %, or less than 15 wt %. The level of volatiles in the polymer immediately downstream of the devolatilizer is preferably no more than 0.5 wt %, or than 0.25 wt %, or no more than 0.1 wt %.

The pressure in the vacuum devolatilizer is preferably no more than 500 mmHg, or no more than 55 mmHg, or no more than 30 mmHg. The temperature is optionally in the range of from 150° C. to 270° C.

The process and the plant used in the present invention are designed as explained above to permit polymerization of a wide variety of polymers, especially applicable to polymerization of a propylene-based polymer, i.e., a copolymer of propylene-derived units as the dominant (more than 50 mol %) component and units derived from at least one of ethylene or a C4-C10 alpha-olefin. The propylene-based polymer may have limited crystallinity due to adjacent isotactic propylene units and a melting point as described herein. The crystallinity and the melting point of the propylene-based polymer can be reduced compared to highly isotactic polypropylene by the introduction of errors in the insertion of propylene.

The amount of propylene-derived units present in the propylene-based polymer may range from an upper limit of about 95 wt %, about 94 wt %, about 92 wt %, about 90 wt %, or about 85 wt %, to a lower limit of about 50 wt %, 55 wt %, 60 wt %, about 65 wt %, about 70 wt %, about 75 wt %, about 80 wt % of the propylene-based polymer.

The comonomer content may be adjusted so that the propylene-based polymer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min. In preferred embodiments, the comonomer is ethylene, 1-hexene, or 1-octene, with ethylene being most preferred. In embodiments where the propylene-based polymer comprises ethylene-derived units, the propylene-based polymer may comprise about 5 to about 25 wt %, or about 8 to about 20 wt %, or about 9 to about 16 wt %, ethylene-derived units. In some embodiments, the propylene-based polymer consists essentially of units derived from propylene and ethylene, i.e., the propylene-based polymer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based polymer, or in an amount such that any other comonomer is intentionally added to the polymerization process.

In some embodiments, the propylene-based polymer may comprise more than one comonomer. Preferred embodiments of a propylene-based polymer having more than one comonomer include propylene-ethylene-octene, propylene-ethylene-hexene, and propylene-ethylene-butene polymers. In embodiments where more than one comonomer derived from at least one of ethylene or a C4-C10 alpha-olefin is present, the amount of one comonomer may be less than about 5 wt % of the propylene-based polymer, but the combined amount of comonomers of the propylene-based polymer is about 5 wt % or greater.

The propylene-based polymer may have a triad tacticity of three propylene units, as measured by $^{13}$C NMR, of at least about 75%, at least about 80%, at least about 82%, at least about 85%, or at least about 90%. Preferably, the propylene-based polymer has a triad tacticity of about 50 to about 99%, or about 60 to about 99%, or about 75 to about 99%, or about 80 to about 99%. In some embodiments, the propylene-based polymer may have a triad tacticity of about 60 to 97%.

The propylene-based polymer has a heat of fusion ("$H_f$"), as determined by DSC, of about 80 J/g or less, or about 70 J/g or less, or about 50 J/g or less, or about 40 J/g or less. The propylene-based polymer may have a lower limit $H_f$ of about 0.5 J/g, or about 1 J/g, or about 5 J/g. For example, the $H_f$ value may range from about 1.0, 1.5, 3.0, 4.0, 6.0, or 7.0 J/g, to about 30, 35, 40, 50, 60, 70, 75, or 80 J/g.

The propylene-based polymer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22% of the crystallinity of isotactic polypropylene.

In some embodiments, the propylene-based polymer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based polymer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based polymer.

The propylene-based polymer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based polymer. The propylene-based polymer may have a $T_m$ of about 110° C. or less, about 105° C. or less, about 100° C. or less, about 90° C. or less, about 80° C. or less, or about 70° C. or less. In some embodiments, the propylene-based polymer has a $T_m$ of about 25 to about 105° C., or about 60 to about 105° C., or about 70 to about 105° C., or about 90 to about 105° C.

The propylene-based polymer may have a density of about 0.850 to about 0.900 g/cm$^3$, or about 0.860 to about 0.880 g/cm$^3$, at room temperature as measured per ASTM D1505.

The propylene-based polymer may have a melt flow rate ("MFR"), as measured per ASTM D1238, 2.16 kg at 230° C., of at least about 2 g/10 min. In some embodiments, the propylene-based polymer may have an MFR of about 2 to about 20 g/10 min, or about 2 to about 10 g/10 min, or about 2 to about 5 g/10 min.

The propylene-based polymer may have an Elongation at Break of less than about 2000%, less than about 1800%, less than about 1500%, less than about 1000%, or less than about 800%, as measured per ASTM D412.

The propylene-based polymer may have a weight average molecular weight ($M_w$) of about 5,000 to about 5,000,000 g/mole, or about 10,000 to about 1,000,000 g/mole, or about 50,000 to about 400,000 g/mole. The propylene-based polymer may have a number average molecular weight ($M_n$) of about 2,500 to about 250,000 g/mole, or about 10,000 to about 250,000 g/mole, or about 25,000 to about 250,000 g/mole. The propylene-based polymer may have a z-average molecular weight ($M_z$) of about 10,000 to about 7,000,000 g/mole, or about 80,000 to about 700,000 g/mole, or about 100,000 to about 500,000 g/mole.

The propylene-based polymer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based polymer is a polymer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based polymer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based polymer.

Preferably, the propylene-based polymer produced according to the polymerization described herein has at least about 60 wt % propylene-derived units and about 5 to about 25 wt % ethylene-derived units, based on total weight of the propylene-based polymer, and a heat of fusion of less than about 80 J/g.

Suitable propylene-based polymers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

EXAMPLES

The present invention, while not meant to be limited by, may be better understood by reference to the following examples.

Example 1

Example 1 illustrates different fouling behaviors of ethylene-based and propylene-based polymers in the feed/solvent recycle system for continuous solution polymerization. Two processes of continuous solution polymerization were separately conducted under corresponding conditions as described herein to an ethylene-based plastomer and a propylene-based elastomer, respectively. Total pressure drop (Percentage Increase in Total Pressure Drop=[(Pressure Drop at Time=X)−(Pressure Drop at Time=0)]/(Pressure Drop at Time=0)) in the two processes were observed and recorded for a set period of time as shown in FIG. 2.

Figure 2:
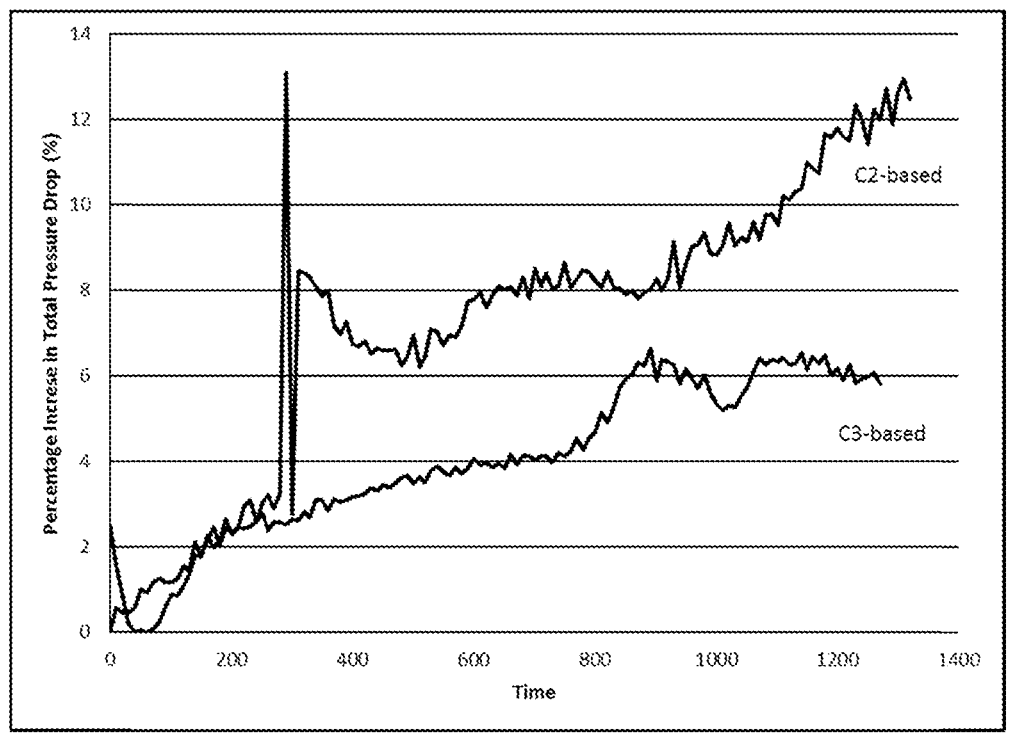
FIG. 2 depicts the different fouling behaviors of ethylene-based and propylene-based polymers.

As illustrated in FIG. 2, the data shows that precipitation of trace propylene-based polymer in the recycled solvent increased the total pressure drop in a distinctive manner as compared to that of the ethylene-based polymers. The greater degree of precipitation of trace propylene-based polymer in the recycled solvent can cause greater degrees of fouling in the production of propylene-based polymers as compared to ethylene-based polymers. Without being bound by theory, it is believed that the greater degree of precipitation of the propylene-based polymers, and thus greater fouling, is likely to be a result of the relatively slow rate of crystallization of the propylene-based polymers as compared to the ethylene-based polymers.

Example 2

As described above, it is believed that the relatively slow rate of crystallization of propylene-based polymers leads to greater fouling during the production of propylene-based polymers. Applicants have found that a source of additional fouling caused by the precipitation of propylene-based polymers is related to non-ideal pump behavior during fouling events. To illustrate that the pump was the source of the additional fouling a controlled pump swap test was conducted.

Figure 3:
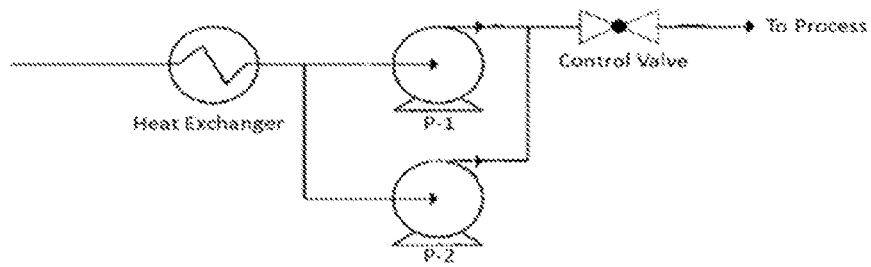
FIG. 3 depicts a schematic layout of the apparatus used for the controlled pump swap test in Example 2.
Figure 4:
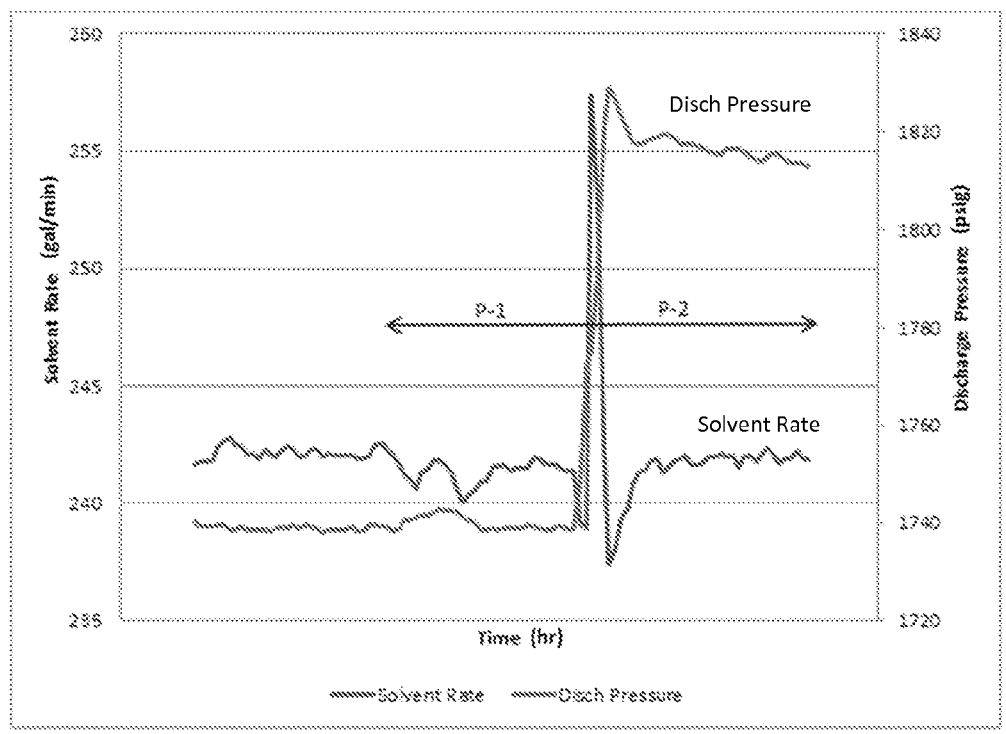
FIG. 4 illustrates the changes in system pressure associated with the controlled pump swap test of Example 2.

The controlled pump swap test was conducted using the apparatus in FIG. 3. A first pump (P-1) in a fouling service was exchanged with a secondary pump (P-2) and the impact of this pump swap on downstream pressure was observed. As illustrated in FIG. 4, the system pressure loss when using P-1 was immediately recovered once the secondary pump (P-2) was put into service. This observation indicates that the pump was responsible for inducing the additional fouling generated during the production of propylene-based polymers. Without being bound by theory, it is believed that the pump may act as a shearing device that accelerates the crystallization of the propylene-based polymers leading to precipitation of the polymer on the pump and thus fouling of the polymerization system.

Example 3

Figure 5:
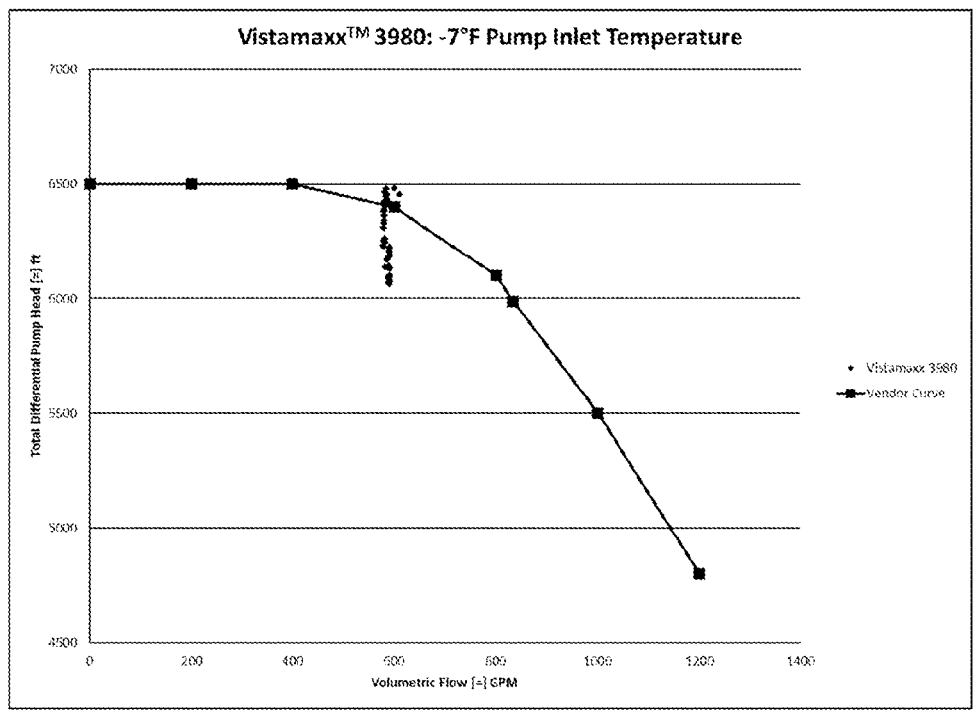
FIGS. 5-8 depict the total differential pump head and control valve status with a solution temperature of −7° F. (about −22° C.) (FIGS. 5 and 6) and 39° F. (about 4° C.) (FIGS. 7 and 8), respectively, during the production of Vistamaxx™ 3980 propylene-based elastomer.
Figure 6:
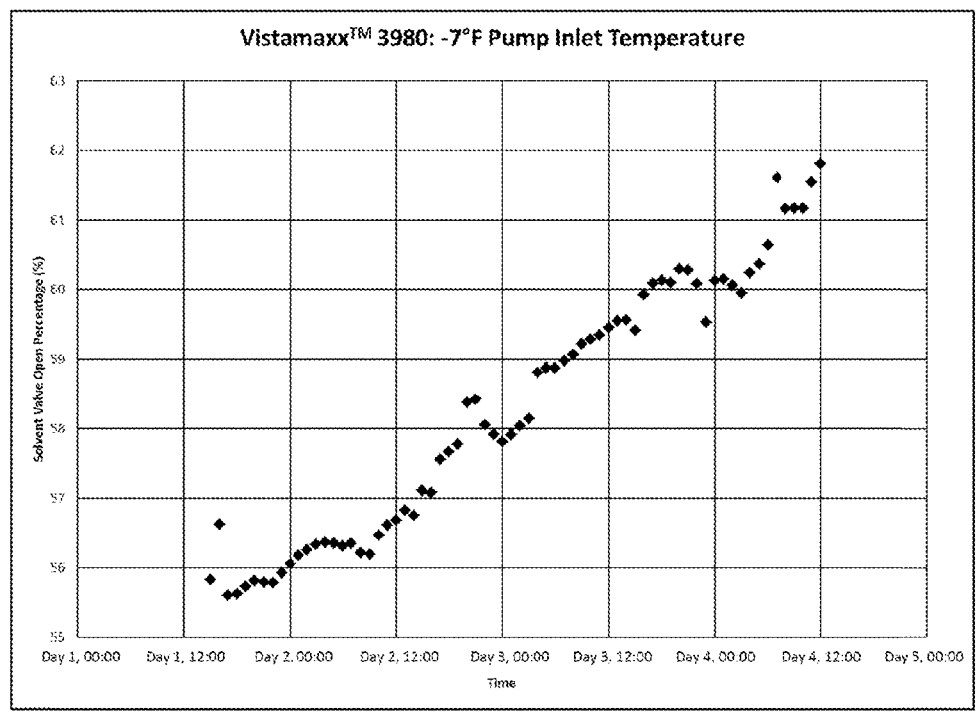
Figure 7:
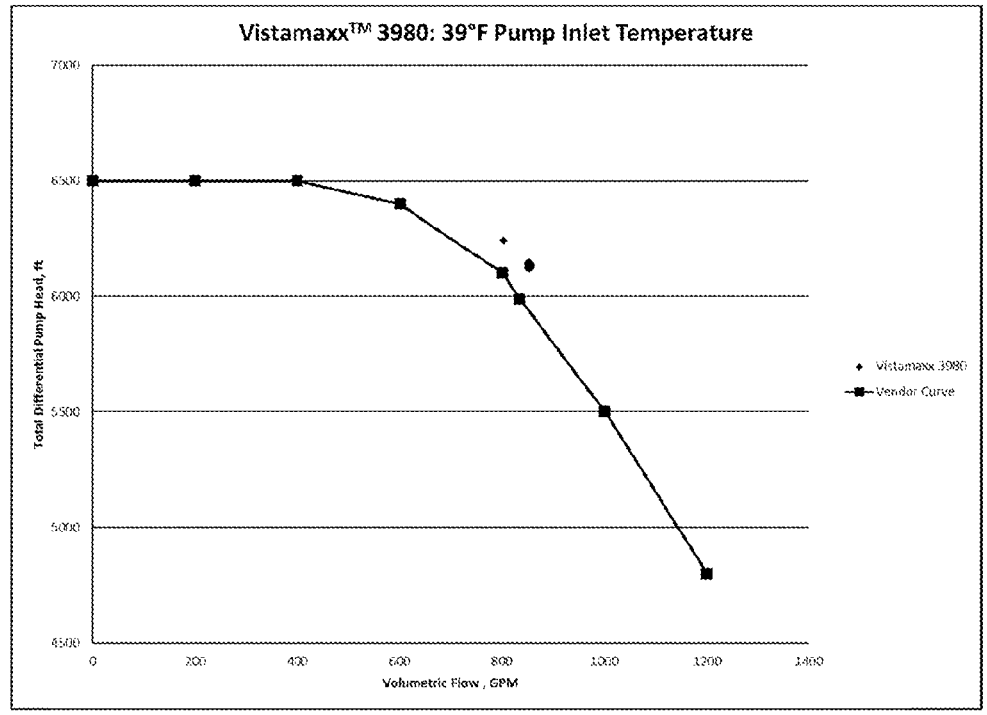
Figure 8:
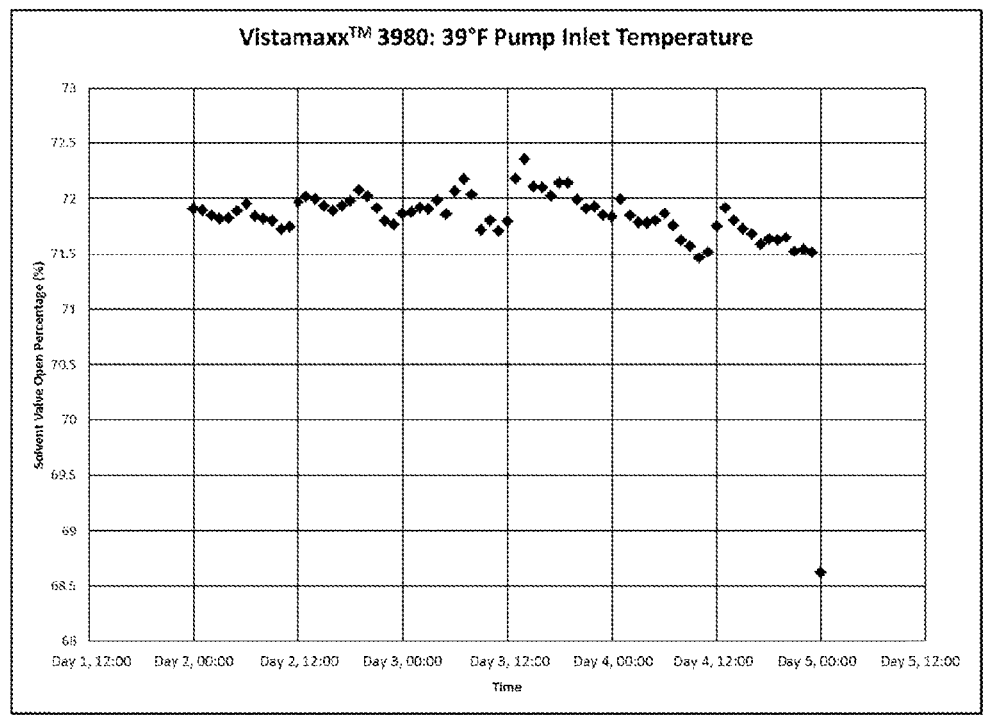

A solution of trace Vistamaxx™ 3980 propylene-based elastomer (ExxonMobil Chemical Company, Houston, Tex., USA) was used in a feed/solvent recycling system described herein at a temperature of −7° F. (about −22° C.) (FIGS. 5 and 6) and 39° F. (about 4° C.) (FIGS. 7 and 8). The total differential pump head and control valve status were measured for assessment. The vendor curve in FIGS. 5 and 7 represents the total differential head the pump is capable of producing (in feet) as a function of volumetric flow rate through the pump (in gallons per minute), providing an index for the pump's performance in clean conditions. During clean operation, the pump is expected to operate at or near curve conditions. As can be seen in FIGS. 5 and 6, at the temperature of −7° F., which is below the cloud point of Vistamaxx™ 3980 propylene-based elastomer, the total differential head of the pump kept declining at a set volumetric flow, which led to lower solvent flow than the desired set point and caused the control valve downstream of the pump to continuously open. In contrast, as illustrated in FIGS. 7 and 8, at the temperature of 39° F., which is above the cloud point of Vistamaxx™ 3980 propylene-based elastomer, the total differential head of the pump followed the vender curve without significant loss, thus making the control valve position stay invariant.

The solvent valve open percentage was determined by the following formula:

Solvent Valve Open Percentage=100%*[(Open Percentage at Time=X)−(Open Percentage at Time=0)]/(100)

Example 4

Figure 9:
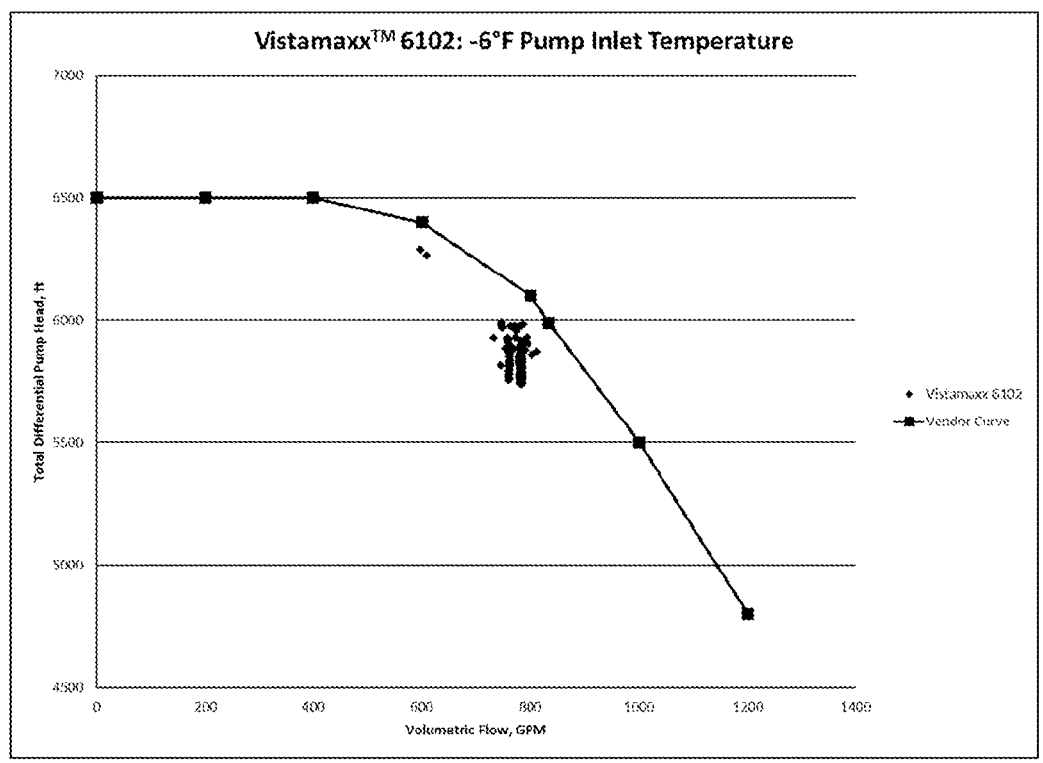
FIGS. 9 and 10 depict the total differential pump head and control valve status with a solution temperature of −6° F. (about −21° C.) during production of Vistamaxx™ 6102 propylene-based elastomer in Example 4.
Figure 10:
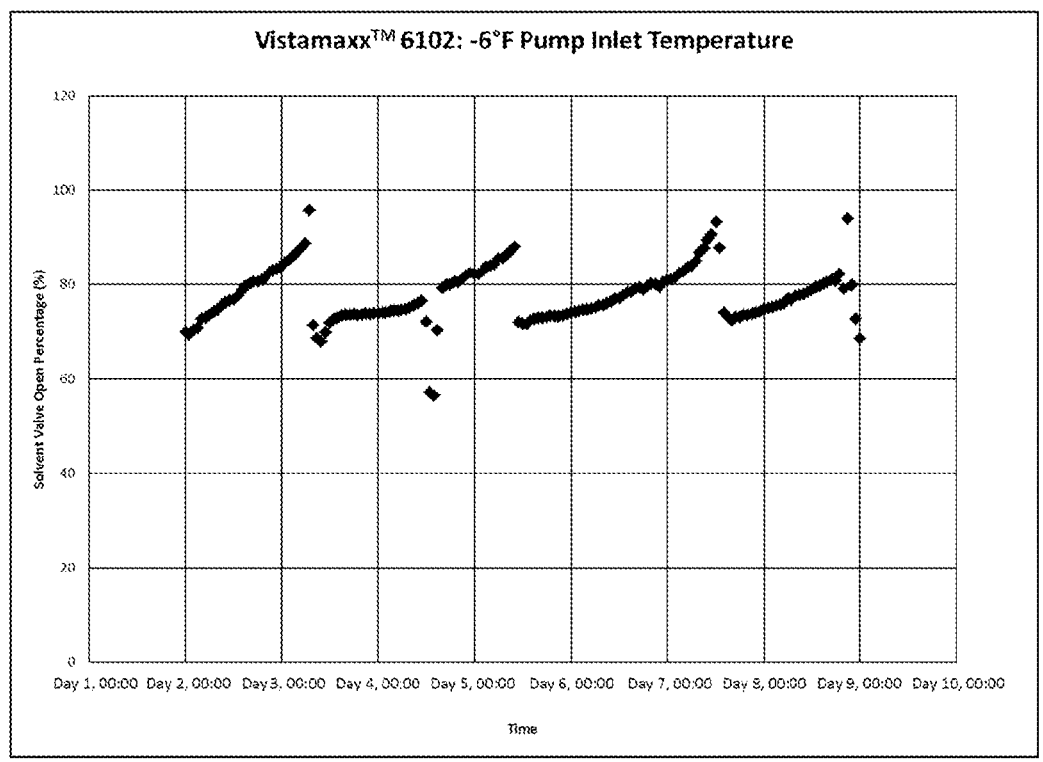
Figure 11:
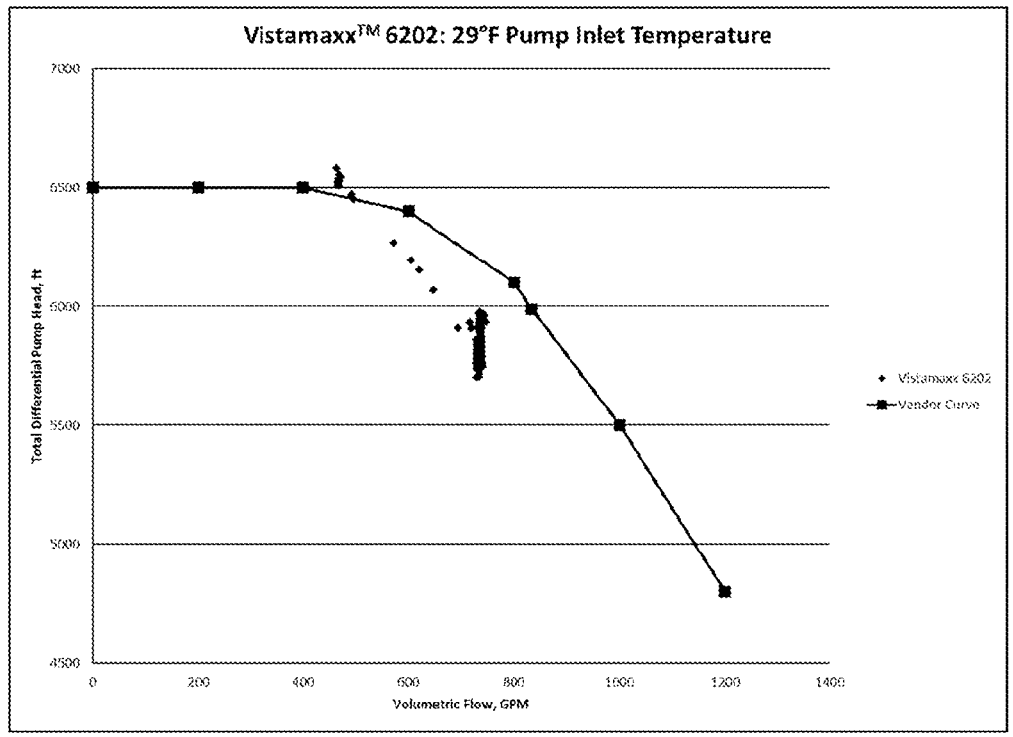
FIGS. 11 and 12 depict the total differential pump head and control valve status with a solution temperature of 29° F. (about 2° C.) during production of Vistamaxx™ 6202 propylene-based elastomer in Example 4.
Figure 12:
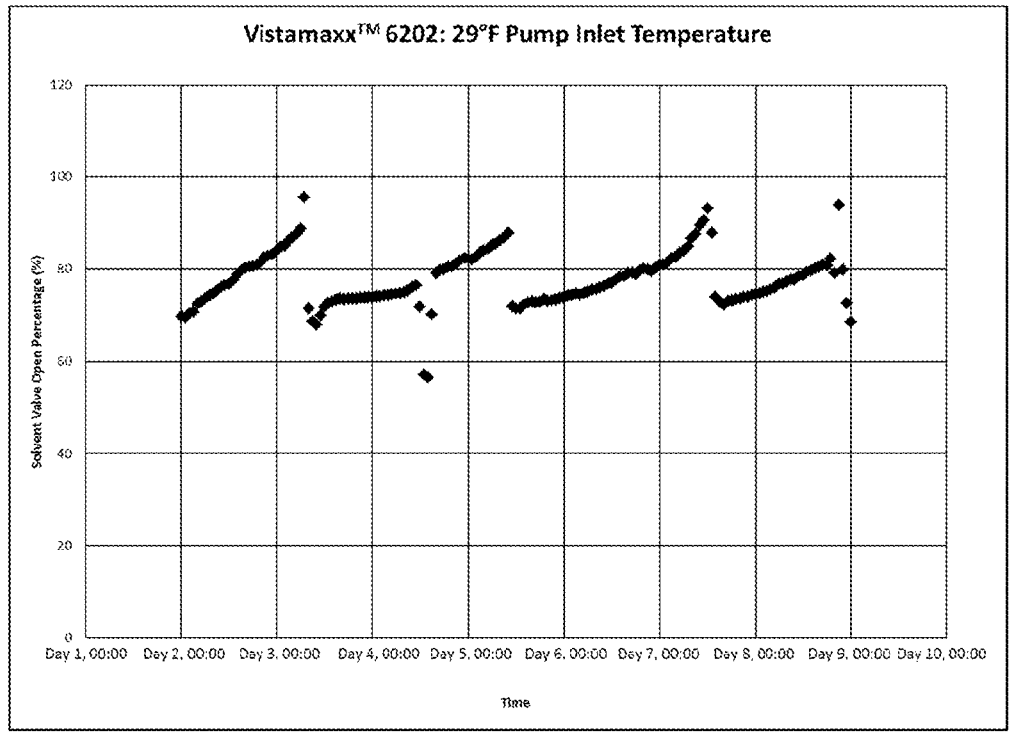

A solution of trace Vistamaxx™ 6102 propylene-based elastomer (ExxonMobil Chemical Company, Houston, Tex., USA) at a temperature of −6° F. (about −21° C.) (FIGS. 9 and 10) and a solution of trace Vistamaxx™ 6202 propylene-based elastomer (ExxonMobil Chemical Company, Houston, Tex., USA) at a temperature of 29° F. (about 2° C.) (FIGS. 11 and 12) were used in a feed/solvent recycling system described herein. The total differential pump head and control valve status were measured for assessment as illustrated in FIGS. 9 and 10 (Vistamaxx™ 6102) and FIGS. 11 and 12 (Vistamaxx™ 6202). As they were both subjected to a temperature below the respective cloud points of the corresponding polymers, these two solutions both resulted in loss of the total differential head of the pump and open control valve position.

Example 5

Figure 13:
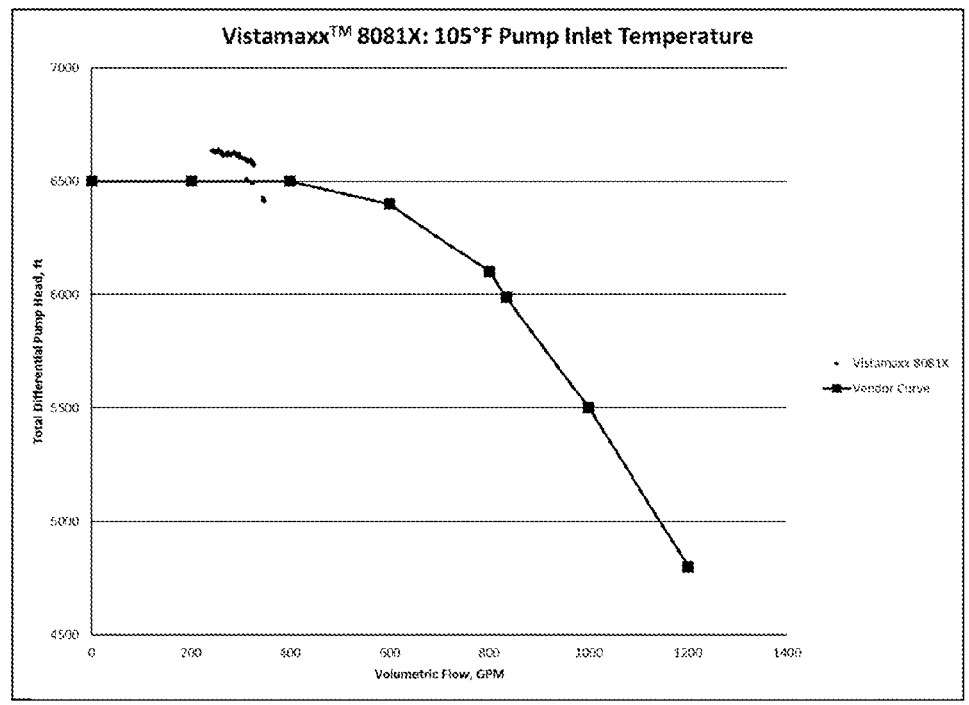
FIGS. 13 and 14 depict the total differential pump head and control valve status with a solution temperature of 105° F. (about 41° C.) during production of Vistamaxx™ 8081X propylene-based elastomer in Example 5.
Figure 14:
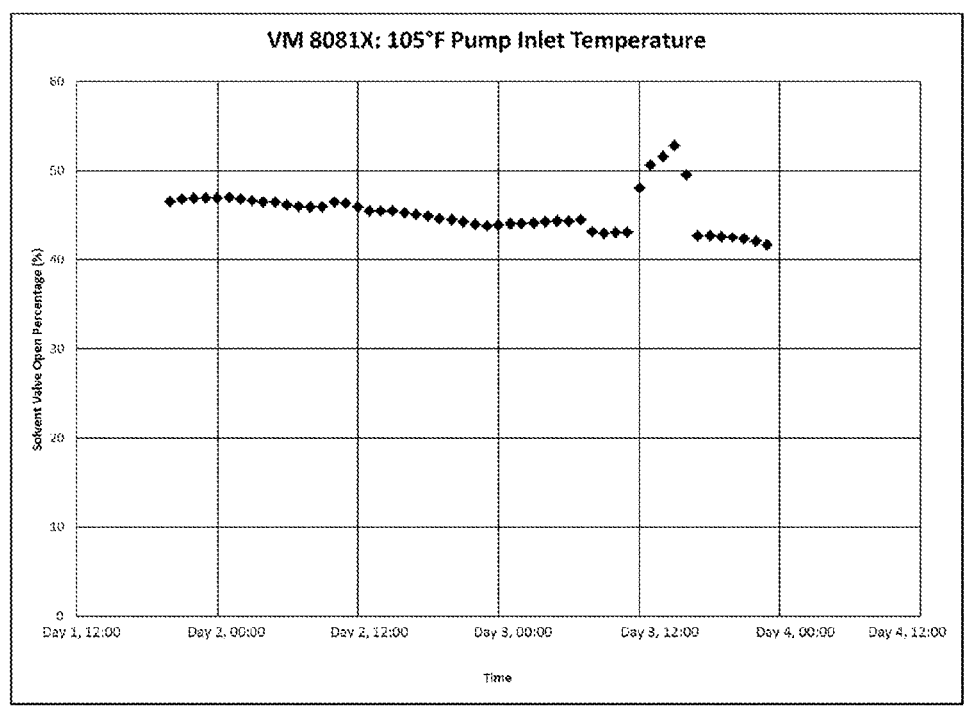
Figure 15:
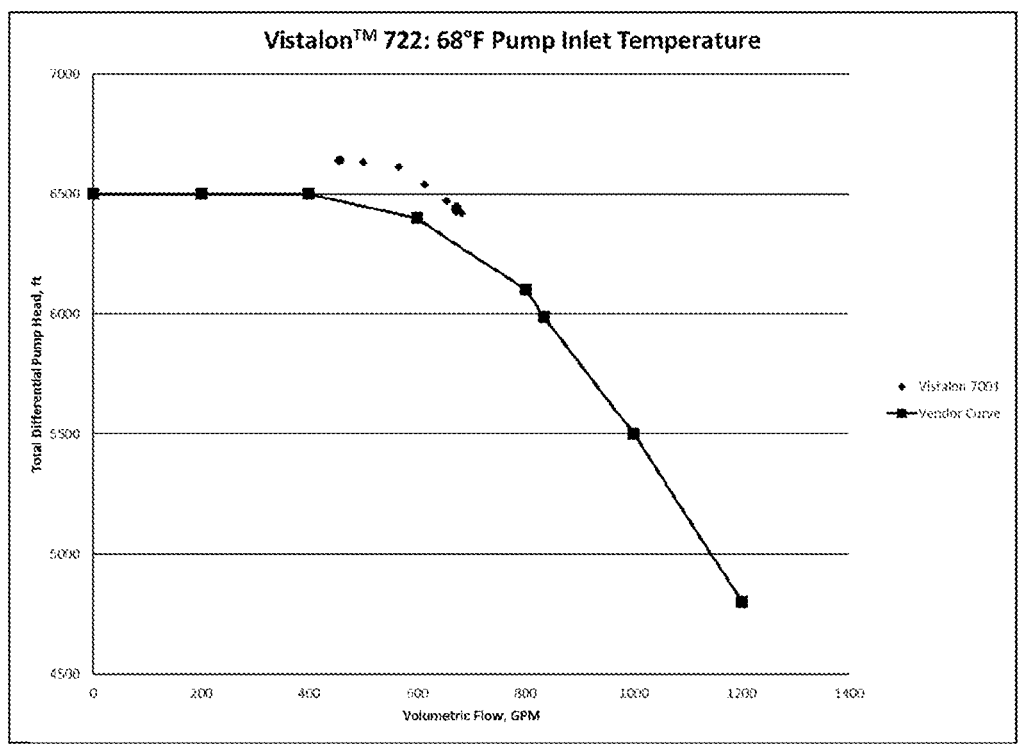
FIGS. 15 and 16 depict the total differential pump head and control valve status with a solution temperature of 68° F. (about 2° C.) during production of Vistalon™ 722 ethylene propylene copolymer rubber in Example 5.
Figure 16:
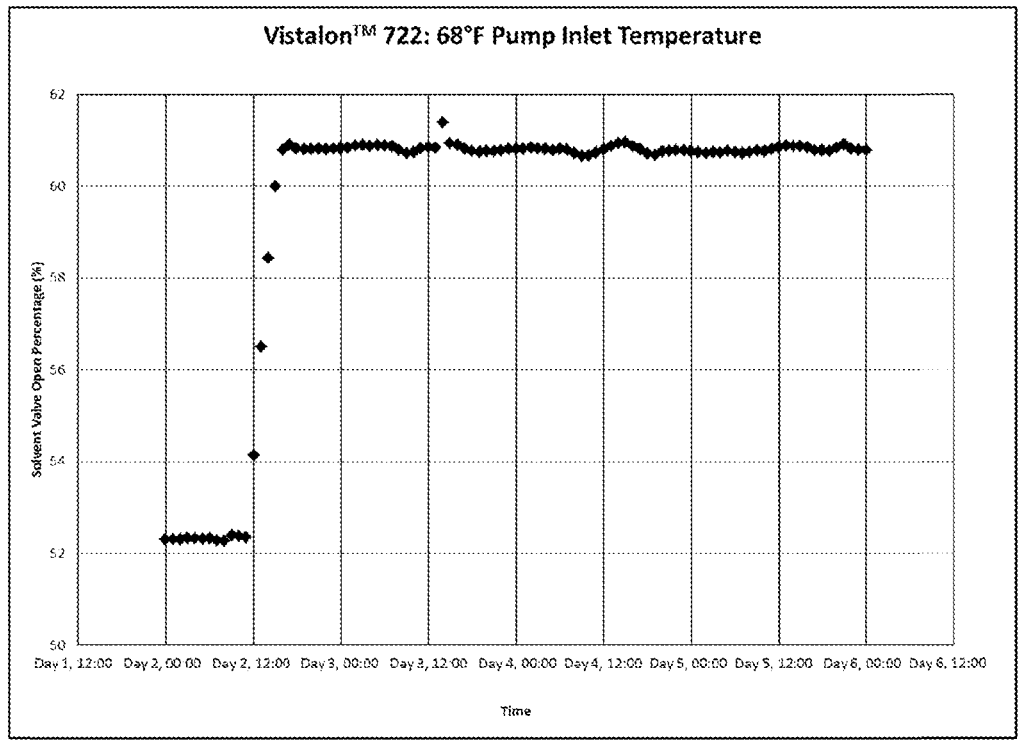

A solution of trace Vistamaxx™ 8081X propylene-based elastomer (ExxonMobil Chemical Company, Houston, Tex., USA) at a temperature of 105° F. (about 41° C.) (FIGS. 13 and 14) and a solution of trace Vistalon™ 722 ethylene propylene copolymer rubber (ExxonMobil Chemical Company, Houston, Tex., USA) at a temperature of 68° F. (about 2° C.) (FIGS. 15 and 16) were used in a feed/solvent recycling system described herein. The total differential pump head and control valve status were measured for assessment as illustrated in FIGS. 13 and 14 (Vistamaxx™ 8081X propylene-based elastomer) and FIGS. 15 and 16 (Vistalon™ 722 ethylene propylene copolymer rubber). The ethylene-based Vistalon™ 722 polymers exhibited faster crystallization rates causing instantaneous precipitation. Therefore, fouling in the polymerization system occurred in heat exchangers upstream of the pump. Likewise, no fouling was observed in the pump for the Vistamaxx™ 8081X propylene-based elastomer. Without being bound by theory, it is believed that this is due to the fact that Vistamaxx™ 8081X propylene-based elastomer is a propylene-based polymer with an ultra-low molecular weight, and the fact that crystallization rate increases as molecular weight lowers. Thus, it is believed that the Vistamaxx™ 8081X propylene-based elastomer had a crystallization rate more similar to the ethylene-based Vistalon™ 722 ethylene propylene copolymer rubber due to the low molecular weight of the Vistamaxx™ 8081X propylene-based elastomer (as compared to the higher molecular weight Vistamaxx™ 3980, 6102, and 6202 propylene-based elastomers of Examples 3 and 4). Therefore, the production of Vistamaxx™ 8081X propylene-based elastomer shared similar fouling behavior with Vistalon™ 722 ethylene propylene copolymer rubber in the heat exchanger upstream of the pump at a temperature above the cloud point, with no evidence of pump fouling shown.

Further specific embodiments of the present invention include those set forth in the following lettered paragraphs:

Embodiment 1

A plant for continuous solution polymerization of a feed comprising one or more olefin monomers and a solvent, the plant comprising: a reactor; blending means to blend one or more olefin monomers and a solvent to produce a feed for the reactor; a pump for pressurizing the feed; and one or more heat exchangers for cooling the feed prior to entry into the reactor; wherein at least one heat exchanger is located downstream of the pump, wherein the feed enters the pump at a temperature above the cloud point of the polymer produced in the reactor, wherein the polymer produced in the reactor is a propylene-based polymer.

Embodiment 2

A plant for continuous solution polymerization of a feed comprising one or more olefin monomers and a solvent, the plant comprising: a reactor; feed blending means to prepare a feed comprising one or more olefin monomers in a solvent and means to supply to the reactor the feed and a catalyst to form therein a polymer-containing reactor mixture; downstream of the reactor, separation means for separating the polymer from the unreacted monomer and the solvent; apparatus for recycling the solvent back through the feed blending means and to the reactor including a pump for pressurizing the solvent and one or more heat exchangers for cooling the solvent prior to re-use; wherein at least one heat exchanger is located downstream of the pump, wherein the solvent enters the pump at a temperature above the cloud point of the polymer produced in the reactor, wherein the polymer produced in the reactor is a propylene-based polymer.

Embodiment 3

The plant of Embodiment 1 or 2, wherein the total differential head of the pump stays substantially the same during the continuous solution polymerization.

Embodiment 4

The plant of any one of Embodiments 1 to 3, wherein the propylene-based polymer comprises at least about 60 wt % propylene-derived units and about 5 to about 25 wt % ethylene-derived units, based on total weight of the propylene-based polymer, and wherein the propylene-based polymer has a heat of fusion of less than about 80 J/g.

Embodiment 5

The plant of any one of Embodiments 1 to 4, wherein the feed is pressurized by the pump to a pressure of at least 75 bar.

Embodiment 6

The plant of any one of Embodiments 1 to 5, wherein the feed is cooled in the at least one heat exchanger to a temperature of from 40° C. to −42° C.

Embodiment 7

A continuous solution polymerization process, wherein a feed comprising one or more olefin monomers and a solvent is pressurized by a pump and then cooled in at least one heat exchanger downstream of the pump prior to being polymerized in a reactor downstream of the heat exchanger, wherein the feed enters the pump at a temperature above the cloud point of the polymer produced in the reactor, wherein the polymer produced in the reactor is a propylene-based polymer.

Embodiment 8

The process of Embodiment 7, wherein the total differential head of the pump stays substantially the same during the continuous solution polymerization.

Embodiment 9

The process of Embodiment 7 or 8, wherein the propylene-based polymer comprises at least about 60 wt % propylene-derived units and about 5 to about 25 wt % ethylene-derived units, based on total weight of the propylene-based polymer, and wherein the propylene-based polymer has a heat of fusion of less than about 80 J/g.

Embodiment 10

The process of any one of Embodiments 7 to 9, wherein the feed is pressurized by the pump to a pressure of at least 75 bar.

Embodiment 11

The process of any one of Embodiments 7 to 10, wherein the feed is cooled in the at least one heat exchanger to a temperature of from 40° C. to −42° C.

Embodiment 12

A method for de-fouling a pump in a plant for continuous solution polymerization of a feed comprising one or more olefin monomers in a solvent, wherein the feed comprising one or more olefin monomers in a solvent is polymerized to provide a polymer-containing polymerization reaction mixture from which the solvent and residual monomer are separated, and the solvent is recycled through an apparatus which includes a pump for pressurizing the solvent and one or more heat exchangers for cooling the solvent prior to entry into the reactor, wherein at least one heat exchanger is located downstream of the pump, the method comprising: passing the solvent first through a pump for pressurizing the solvent, and then through at least one heat exchanger downstream of the pump for cooling the solvent prior to re-use; wherein the solvent enters the pump at a temperature above the cloud point of the polymer produced in the reactor, wherein the polymer produced in the reactor is a propylene-based polymer, wherein the total differential head of the pump stays substantially the same during the continuous solution polymerization.

Embodiment 13

The method of Embodiment 12, wherein the propylene-based polymer comprises at least about 60 wt % propylene-derived units and about 5 to about 25 wt % ethylene-derived units, based on total weight of the propylene-based polymer, and wherein the propylene-based polymer has a heat of fusion of less than about 80 J/g.

Embodiment 14

The method of Embodiment 12 or 13, wherein the solvent is pressurized by the pump to a pressure of at least 75 bar.

Embodiment 15

The method of any one of Embodiments 12 to 14, wherein the solvent is cooled in the at least one heat exchanger to a temperature of from 40° C. to −42° C.

It will be appreciated that the aspects of the present invention mentioned above may be practiced separately or one or more aspects of the present invention may be practiced together. The optional and preferred features of each aspect of the present invention will also be optional aspects of the other aspects of the present invention.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the present invention have been illustrated and described, various modifications can be made without departing from the spirit and scope of the present invention. Accordingly, it is not intended that the present invention be limited thereby.

What is claimed is:

1. A continuous solution polymerization process, wherein a feed comprising one or more olefin monomers and a solvent is pressurized by a pump and then cooled in at least one heat exchanger downstream of the pump prior to being polymerized in a reactor downstream of the heat exchanger, wherein the feed enters the pump at a temperature above the cloud point of the polymer produced in the reactor, wherein the polymer produced in the reactor is a propylene-based polymer.

2. The process of claim 1, wherein the total differential head of the pump stays substantially the same during the continuous solution polymerization.

3. The process of claim 1, wherein the propylene-based polymer comprises at least about 60 wt % propylene-derived units and about 5 to about 25 wt % ethylene-derived units, based on total weight of the propylene-based polymer, and wherein the propylene-based polymer has a heat of fusion of less than about 80 J/g.

4. The process of claim 1, wherein the feed is pressurized by the pump to a pressure of at least 75 bar.

5. The process of claim 1, wherein the feed is cooled in the at least one heat exchanger to a temperature of from 40° C. to −42° C.

6. A method for de-fouling a pump in a plant for continuous solution polymerization of a feed comprising one or more olefin monomers in a solvent, wherein the feed comprising one or more olefin monomers in a solvent is polymerized to provide a polymer-containing polymerization reaction mixture from which the solvent and residual monomer are separated forming a lean phase, and the lean phase is recycled through an apparatus which includes a pump for pressurizing the lean phase and one or more heat exchangers for cooling the lean phase prior to entry into the reactor, wherein at least one heat exchanger is located downstream of the pump, the method comprising:

passing the lean phase first through a pump for pressurizing the lean phase, and then through at least one heat exchanger downstream of the pump for cooling the lean phase prior to re-use in the reactor;

wherein the lean phase enters the pump at a temperature above the cloud point of the polymer produced in the reactor, wherein the polymer produced in the reactor is a propylene-based polymer, and wherein the total differential head of the pump stays substantially the same during the continuous solution polymerization.

7. The method of claim 6, wherein the propylene-based polymer comprises at least about 60 wt % propylene-derived units and about 5 to about 25 wt % ethylene-derived units, based on total weight of the propylene-based polymer, and wherein the propylene-based polymer has a heat of fusion of less than about 80 J/g.

8. The method of claim 6, wherein the lean phase is pressurized by the pump to a pressure of at least 75 bar.

9. The method of claim 6, wherein the lean phase is cooled in the at least one heat exchanger to a temperature of from 40° C. to −42° C.

* * * * *